US008398478B2

(12) United States Patent
Okada

(10) Patent No.: US 8,398,478 B2
(45) Date of Patent: Mar. 19, 2013

(54) GAMING MACHINE CAPABLE OF AWARDING PAYOUT BASED ON THE NUMBER OF GAMES PLAYED AND PLAYING METHOD THEREOF

(75) Inventor: Kazuo Okada, Tokyo (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 233 days.

(21) Appl. No.: 12/787,759

(22) Filed: May 26, 2010

(65) Prior Publication Data

US 2010/0304823 A1 Dec. 2, 2010

(30) Foreign Application Priority Data

Jun. 1, 2009 (JP) ................................ 2009-131949

(51) Int. Cl.
*G06F 17/00* (2006.01)

(52) U.S. Cl. ........................................... 463/20; 463/17

(58) Field of Classification Search ............... 463/16–20
See application file for complete search history.

(56) References Cited

U.S. PATENT DOCUMENTS

| | | | |
|---|---|---|---|
| 4,283,709 | A | 8/1981 | Lucero et al. |
| 4,624,459 | A | 11/1986 | Kaufman |
| 4,669,731 | A | 6/1987 | Clarke |
| 4,837,728 | A | 6/1989 | Barrie et al. |
| 4,964,638 | A | 10/1990 | Ishida |
| 5,178,390 | A | 1/1993 | Okada |
| 5,280,909 | A | 1/1994 | Tracy |
| 5,564,700 | A | 10/1996 | Celona |
| 5,611,730 | A | 3/1997 | Weiss |
| 5,639,088 | A | 6/1997 | Schneider et al. |
| 5,695,402 | A | 12/1997 | Stupak |
| 5,702,303 | A | 12/1997 | Takemoto et al. |
| 5,770,533 | A | 6/1998 | Franchi |
| 5,820,459 | A | 10/1998 | Acres et al. |
| 5,836,817 | A | 11/1998 | Acres et al. |
| 5,890,963 | A | 4/1999 | Yen |
| 5,910,048 | A | 6/1999 | Feinberg |
| 6,001,016 | A | 12/1999 | Walker et al. |
| 6,003,013 | A | 12/1999 | Boushy et al. |
| 6,089,980 | A | 7/2000 | Gauselmann |
| 6,224,482 | B1 | 5/2001 | Bennett |
| 6,234,896 | B1 | 5/2001 | Walker et al. |

(Continued)

FOREIGN PATENT DOCUMENTS

| | | |
|---|---|---|
| DE | 32 42 890 A1 | 5/1984 |
| DE | 37 12 841 A1 | 11/1988 |

(Continued)

*Primary Examiner* — Michael Cuff

(74) *Attorney, Agent, or Firm* — Edwards Wildman Palmer LLP

(57) ABSTRACT

The gaming machine: counts the number of base games having been run; causes shifting to a second state which is more advantageous for a player than the base game, when a first predetermined number of base games is counted without shifting to the first state which is more advantageous for the player than the base game; runs a skill-requiring game after the second state, which game outputs a result according to an operation from outside, and increases or decreases a second predetermined number according to a result of the skill-requiring game; runs the base game after the skill-requiring game; and causes shifting to a third state which is more advantageous for the player than the base game, when the increased or decreased second predetermined number of base games having run are counted after the skill-requiring game.

9 Claims, 28 Drawing Sheets

U.S. PATENT DOCUMENTS

| | | | | |
|---|---|---|---|---|
| 6,244,957 | B1 | 6/2001 | Walker et al. | |
| 6,254,483 | B1 | 7/2001 | Acres | |
| 6,257,981 | B1 | 7/2001 | Acres et al. | |
| 6,270,409 | B1 | 8/2001 | Shuster | |
| 6,273,820 | B1 | 8/2001 | Haste, III | |
| 6,604,999 | B2 | 8/2003 | Ainsworth | |
| 6,695,697 | B1 | 2/2004 | Okada | |
| 6,932,704 | B2 | 8/2005 | Walker et al. | |
| 6,932,707 | B2 | 8/2005 | Duhamel | |
| 7,568,973 | B2 * | 8/2009 | Iddings et al. | 463/25 |
| 7,871,323 | B2 * | 1/2011 | Walker et al. | 463/16 |
| 7,887,410 | B2 * | 2/2011 | Okada | 463/20 |
| 7,976,383 | B2 * | 7/2011 | Fujimoto et al. | 463/25 |
| 2002/0065124 | A1 | 5/2002 | Ainsworth | |
| 2003/0069073 | A1 | 4/2003 | Okada | |
| 2004/0053676 | A1 | 3/2004 | Rodgers | |
| 2006/0025207 | A1 * | 2/2006 | Walker et al. | 463/25 |
| 2007/0060250 | A1 | 3/2007 | Okada et al. | |
| 2007/0060277 | A1 | 3/2007 | Okada | |
| 2007/0060278 | A1 | 3/2007 | Okada | |
| 2007/0060279 | A1 | 3/2007 | Okada et al. | |
| 2007/0060280 | A1 | 3/2007 | Okada | |
| 2007/0060281 | A1 | 3/2007 | Okada et al. | |
| 2007/0060282 | A1 | 3/2007 | Okada et al. | |
| 2007/0060283 | A1 | 3/2007 | Okada | |
| 2007/0060324 | A1 | 3/2007 | Okada | |
| 2007/0293308 | A1 * | 12/2007 | Jackson et al. | 463/25 |
| 2008/0248867 | A1 * | 10/2008 | Englman et al. | 463/25 |
| 2009/0011827 | A1 * | 1/2009 | Englman et al. | 463/27 |
| 2009/0227376 | A1 * | 9/2009 | Oomori | 463/41 |
| 2009/0325676 | A1 * | 12/2009 | Inamura | 463/20 |
| 2010/0056255 | A1 * | 3/2010 | Yoshizawa | 463/20 |
| 2010/0234089 | A1 * | 9/2010 | Saffari et al. | 463/20 |
| 2011/0244944 | A1 * | 10/2011 | Baerlocher | 463/20 |

FOREIGN PATENT DOCUMENTS

| | | | |
|---|---|---|---|
| DE | 41 37 010 | A1 | 8/1992 |
| DE | 100 49 444 | A1 | 11/2001 |
| EP | 0 631 798 | A1 | 1/1995 |
| EP | 1 192 975 | A1 | 4/2002 |
| EP | 1 302 914 | A2 | 4/2003 |
| EP | 1 351 180 | A2 | 10/2003 |
| EP | 1 477 947 | A2 | 11/2004 |
| EP | 1 544 811 | A2 | 6/2005 |
| GB | 2 326 830 | A | 1/1999 |
| WO | WO 03/083795 | A1 | 10/2003 |
| WO | WO 2004/095383 | A1 | 11/2004 |
| WO | 2007/026396 | A1 | 3/2007 |
| WO | 2007/026399 | A1 | 3/2007 |
| WO | 2007/026400 | A1 | 3/2007 |
| WO | 2007/026401 | A1 | 3/2007 |
| WO | 2007/026402 | A1 | 3/2007 |
| WO | 2007/026403 | A1 | 3/2007 |
| WO | 2007/026404 | A1 | 3/2007 |
| WO | 2007/026406 | A1 | 3/2007 |
| WO | 2007/026407 | A1 | 3/2007 |

* cited by examiner

FIG. 7

SYMBOL TABLE

| | | FIRST COLUMN(L1) | SECOND COLUMN(L2) | THIRD COLUMN(L3) | FOURTH COLUMN(L4) | FIFTH COLUMN(L5) |
|---|---|---|---|---|---|---|
| CODE NO. | RANDOM NUMBER | SYMBOL | SYMBOL | SYMBOL | SYMBOL | SYMBOL |
| 0 | 0-3277 | J | WILD | A | Q | J |
| 1 | 3278-6555 | Q | A | J | J | A |
| 2 | 6556-9833 | BAT | Q | BAT | BAT | BAT |
| 3 | 9834-13111 | J | HAMMER | SWORD | Q | J |
| 4 | 13112-16389 | Q | SWORD | RHINOCEROS | K | A |
| 5 | 16390-19667 | RHINOCEROS | WILD | BAT | BAT | BUFFALO |
| 6 | 19668-22945 | A | BUFFALO | FEATURE | A | RHINOCEROS |
| 7 | 22946-26223 | DEER | DEER | A | K | FEATURE |
| 8 | 26224-29501 | SWORD | K | J | HAMMER | K |
| 9 | 29502-32779 | HAMMER | RHINOCEROS | HAMMER | Q | HAMMER |
| 10 | 32780-36057 | A | WILD | A | DEER | Q |
| 11 | 36058-39335 | Q | A | Q | SWORD | BAT |
| 12 | 39336-42613 | SWORD | HAMMER | DEER | FEATURE | K |
| 13 | 42614-45891 | RHINOCEROS | DEER | K | K | DEER |
| 14 | 45892-49169 | K | J | BUFFALO | SWORD | SWORD |
| 15 | 49170-52447 | A | SWORD | Q | DEER | J |
| 16 | 52448-55725 | HAMMER | SWORD | FEATURE | A | WILD |
| 17 | 55726-59003 | J | BAT | A | HAMMER | HAMMER |
| 18 | 59004-62281 | Q | WILD | HAMMER | BUFFALO | SWORD |
| 19 | 62282-65535 | BUFFALO | FEATURE | SWORD | RHINOCEROS | Q |

RANGE OF RANDOM NUMBERS:0-65535

FIG. 8

PAYOUT TABLE

| | TWO | THREE | FOUR | FIVE |
|---|---|---|---|---|
| A | 2 | 4 | 6 | 8 |
| K | 10 | 20 | 30 | 40 |
| Q | 30 | 60 | 90 | 120 |
| J | 3 | 6 | 9 | 12 |
| SWORD | 2 | 4 | 6 | 8 |
| HAMMER | 2 | 4 | 6 | 8 |
| BAT | 5 | 4 | 15 | 20 |
| DEER | 15 | 30 | 45 | 60 |
| RHINOCEROS | 8 | 16 | 24 | 32 |
| BUFFALO | 25 | 50 | 75 | 100 |
| FEATURE | 2 | 4 | 6 | 8 |

FEATURE: (FREE GAME)
FREE GAME IS RUN WHEN THREE OR MORE "FEATURE" SYMBOLS ARE REARRANGED

GAMING MACHINE CAPABLE OF AWARDING PAYOUT BASED ON THE NUMBER OF GAMES PLAYED AND PLAYING METHOD THEREOF

CROSS REFERENCE TO RELATED APPLICATION

The present application claims priority from Japanese Patent Application No. 2009-131949, which was filed on Jun. 1, 2009, the disclosure of which is herein incorporated by reference in its entirety.

BACKGROUND OF THE INVENTION

1. Field of the Invention

The present invention relates to a gaming machine capable of awarding a payout based on the number of games played and a gaming method thereof.

2. Description of Related Art

An example of conventional gaming machines is a slot machine. A slot machine displays scrolling plural symbols on a display on the front of the cabinet when a player inserts a game value such as a coin and a bill or when an input is made to a spin button, and then stops the scroll of the symbols. In a slot machine having such a configuration, as disclosed in the specification of U.S. Pat. No. 6,604,999B2, the specification of U.S. patent publication No. 2002065124A1, or the specification of U.S. patent publication No. 20040053676A1, for example, a predetermined amount of game values is paid out when symbols stopped on a winning line correspond to a predetermined combination.

As such, a player playing a slot machine runs a game after betting a desirable amount of game value. When the game results in a win, the player receives a payout corresponding to the amount of betted game value. When the game results in a lose, the player loses the betted game value.

After repeating the game play many times, a payout rate becomes more or less constant no matter whether the scrolling symbols are stopped when the stop button is pressed or the scrolling symbols are automatically stopped at a random timing. The payout rate indicates a ratio between an accumulated value of game value payout having been obtained as a result of previous winnings and game values inserted into the insertion slot of the slot machine before the start of each game. The payout rate is determined in advance in the slot machine. Therefore, in general, the probability of a winning which provides a large amount of game values as a payout despite the single winning or a winning which triggers a special game (bonus game) having higher probability of winning is set so that such a winning occurs once every 100 games or so, for example, in consideration of its payout rate.

However, since the occurrence frequency of the above-described winning is determined as a probability, actually, these types of winning may occur twice while playing 100 games, or may not occur even if 200 or 300 games are played. When no winning is achieved after playing a lot of games, the player keeps losing the game values and hence he/she may lose interest in continuing the games.

Examples of the above-described slot machine are recited in U.S. Pat. Nos. 5,178,390, 5,820,459, 6,695,697, 6,254,483, 5,611,730, 5,639,088, 6,257,981, 6,234,896, 6,001,016, 6,273,820, 6,224,482, 4,669,731, 6,244,957, 5,910,048, 5,695,402, 6,003,013, 4,283,709, 4,964,638, 6,089,980, 5,280,909, 5,702,303, 6,270,409, 5,770,533, 5,836,817, 6,932,704, 6,932,707, 4,837,728, 4,624,459, 5,564,700, 5,890,963, U.S. Laid-Open Patent Application No. 2003/0069073, European Laid-Open Patent Publication No. 1192975, European Laid-Open Patent Publication No. 1302914, European Laid-Open Patent Publication No. 1544811, European Laid-Open Patent Publication No. 1477947, European Laid-Open Patent Publication No. 1351180, European Laid-Open Patent Publication No. 0631798, German Laid-Open Patent Publication No. 4137010, German Laid-Open Patent Publication No. 3712841, German Laid-Open Patent Publication No. 3242890, German Laid-Open Patent Publication No. 10049444, British Laid-Open Patent Publication No. 2326830, WO2004/095383, WO03/083795, WO2007/026396, WO2007/026401, WO2007/026400, WO2007/026406, WO2007/026399, WO2007/026407, WO2007/026402, WO2007/026403, and WO2007/026404. The slot machines disclosed in these documents have a rescue function with which a payout or bonus is awarded in response to a predetermined number of games or lost number of games.

As described above, it has been desirable for gaming machines to have various rescue functions to keep the players not to lose expectation on payout and bonus.

An object of the present invention is to provide a gaming machine which keeps the player motivated for playing games by providing an expectation of payout to the player based on the number of games played, and a playing method thereof.

SUMMARY OF THE INVENTION

The present invention provides a gaming machine having the following structure. That is, the gaming machine includes: a first input device which is able to receive an operation from outside; and a controller programmed to execute the following processes (a1)-(a9).

(a1) A process to run a base game which is started based on betting and awards a base payout according to a result. (a2) A process to count the number of base games having been run. (a3) A process to shift to a first state which is more advantageous for a player than the base game, if the result of the base game satisfies a predetermined condition. (a4) A process to reset counting of the number of base games if shifting to the first state has been done. (a5) A process to shift to a second state which is more advantageous for the player than the base game, if the number of counted base games becomes equal to a first predetermined number. (a6) A process to run, after the second state, a skill-requiring game which outputs a result in accordance with an operation input to the first input device. (a7) A process to increase or decrease a second predetermined number in accordance with a result of the skill-requiring game. (a8) A process to run the base game after the skill-requiring game. (a9) A process to shift to a third state which is more advantageous for the player than the base game, when the number of base games run after the skill-requiring game becomes equal to the second predetermined number of base games after increase or decrease.

According to the arrangement above, even if shifting to the first state which is more advantageous for the player than the base game does not occur, shifting to the second state and the third state which are more advantageous for the player than the base game may occur if the player continue to play the base game. This encourages the player to continue to play the game. In addition to the above, the second predetermined number which indicates the number of games to be played until the shifting to the third state is increased or decreased according to a result of the skill-requiring game run after the second state. This provides a variation in the game so that the entertainment characteristic is enhanced and the player's motivation to continue the game is further increased as he/she expects shifting to the third state.

The present invention provides a gaming machine having the following structure. That is, the gaming machine includes: a first input device which is able to receive an operation from outside; and a controller programmed to execute the following processes (a1)-(a9).

(a1) A process to run a base game which is started based on betting and awards a base payout according to a result. (a2) A process to count the number of base games having been run. (a3) A process to shift to a first state which is more advantageous for a player than the base game, if the result of the base game satisfies a predetermined condition. (a4) A process to reset counting of the number of base games if shifting to the first state has been done. (a5) A process to shift to a second state which is more advantageous for the player than the base game, if the number of counted base games becomes equal to a first predetermined number. (a6) A process to run, after the second state, a skill-requiring game which outputs a result in accordance with an operation input to the first input device. (a7) A process to increase or decrease a second predetermined number in accordance with a result of the skill-requiring game. (a8) A process to run the base game after the skill-requiring game. (a9) A process to shift to a third state which is more advantageous for the player than the base game, when the number of base games becomes equal to the second predetermined number of base games.

According to the arrangement above, even if shifting to the first state which is more advantageous for the player than the base game does not occur, shifting to the second state and the third state which are more advantageous for the player than the base game may occur if the player continue to play the base game. This encourages the player to continue to play the game. In addition to the above, the second predetermined number which indicates the number of games to be played from the reset of the counting to the shifting to the third state is increased or decreased according to a result of a skill-requiring game which is run after the second state. This provides a variation in the game so that the entertainment characteristic is enhanced and the player's motivation to continue the game is further increased as he/she expects shifting to the third state.

The present invention may further include a reporting device, and may be further arranged so that the controller may be programmed to carry out a process to notify information based on the number of games until shifting to the third state, in the base game after the skill-requiring game.

According to the arrangement above, in the base game which is run after the skill-requiring game, the reporting device notifies the number of games to be played until the shifting to the third state. This allows the player to recognize the second predetermined number which is the result of the skill-requiring game, thereby motivating the player to continue to play the game.

The present invention may further include a second input device which is able to switch between an insured mode and a non-insured mode, and may be arranged so that the controller is programmed to execute the process (a2) only when the insured mode has been set by the second input device.

According to this arrangement, the process to count the number of base games is carried out only when the insured mode has been set by the second input device which can switch between the insured mode and the non-insured mode insured mode.

This allows the player to play the game with a desired mode, thereby further enhancing the entertainment characteristic For example, when the insured mode requires a higher bet value than the non-insured mode, the player can choose one of: the insured mode in which shifting to an advantageous state occurs based on the number of games played with a high bet value; and the non-insured mode in which the game is playable with a low bet value but shifting to an advantageous state does not occur.

In addition to the above, the first input device of the present invention may function as a maximum bet device which carries out the betting with a maximum bet value in response to an input from the outside, and the maximum bet device may also functions as a second input device.

According to this arrangement, it is possible to integrate a device for switching between the insured mode and the non-insured mode with a device for performing betting with the maximum bet value.

The present invention provides a gaming method of a gaming machine, including the step S of:

running a base game which is started based on betting and awards a base payout according to a result;

counting the number of base games having been run;

shifting to a first state which is more advantageous for a player than the base game, if the result of the base game satisfies a predetermined condition;

resetting counting of the number of base games if shifting to the first state has been done;

shifting to a second state which is more advantageous for the player than the base game, if the number of counted base games becomes equal to a first predetermined number;

running, after the second state, a skill-requiring game which outputs a result in accordance with an operation input to a first input device which is able to receive an operation from outside;

increasing or decreasing a second predetermined number in accordance with a result of the skill-requiring game;

running the base game after the skill-requiring game; and shifting to a third state which is more advantageous for the player than the base game, when the number of base games run after the skill-requiring game becomes equal to the second predetermined number of base games after increase or decrease.

According to the arrangement above, even if shifting to the first state which is more advantageous for the player than the base game does not occur, shifting to the second state and the third state which are more advantageous for the player than the base game may occur if the player continue to play the base game. This encourages the player to continue to play the game. In addition to the above, the second predetermined number which indicates the number of games to be played until the shifting to the third state is increased or decreased according to a result of the skill-requiring game run after the second state. This provides a variation in the game so that the entertainment characteristic is enhanced and the player's motivation to continue the game is further increased as he/she expects shifting to the third state.

The present invention provides a gaming method of a gaming machine, including the step S of:

running a base game which is started based on betting and awards a base payout according to a result;

counting the number of base games having been run;

shifting to a first state which is more advantageous for a player than the base game, if the result of the base game satisfies a predetermined condition;

resetting counting of the number of base games if shifting to the first state has been done;

shifting to a second state which is more advantageous for the player than the base game, if the number of counted base games becomes equal to a first predetermined number;

running, after the second state, a skill-requiring game which outputs a result in accordance with an operation input to a first input device which is able to receive an operation from outside;

increasing or decreasing a second predetermined number in accordance with a result of the skill-requiring game;

running the base game after the skill-requiring game; and shifting to a third state which is more advantageous for the player than the base game, when the number of base games becomes equal to the second predetermined number of base games.

According to the arrangement above, even if shifting to the first state which is more advantageous for the player than the base game does not occur, shifting to the second state and the third state which are more advantageous for the player than the base game may occur if the player continue to play the base game. This encourages the player to continue to play the game. In addition to the above, the second predetermined number which indicates the number of games to be played from the reset of the counting to the shifting to the third state is increased or decreased according to a result of the skill-requiring game run after the second state. This provides a variation in the game so that the entertainment characteristic is enhanced and the player's motivation to continue the game is further increased as he/she expects shifting to the third state.

BRIEF DESCRIPTION OF THE DRAWINGS

FIG. 7 is an explanatory diagram of a symbol table.

FIG. 8 is an explanatory diagram of a payout table.

DESCRIPTION OF THE PREFERRED EMBODIMENTS (First Embodiment)

(Gaming Machine Overview)

Figure 1:
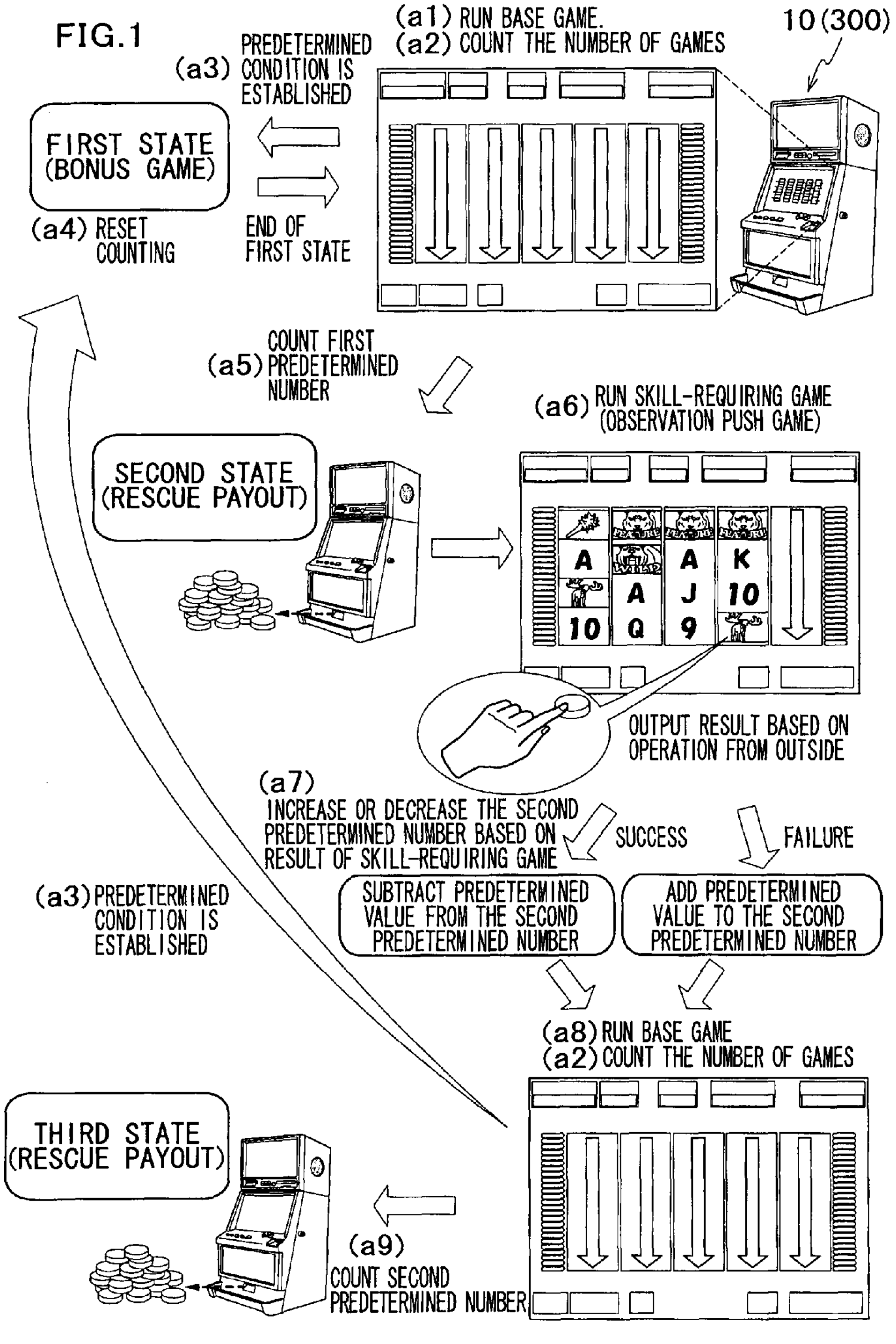
FIG. 1 is an explanatory diagram illustrating a playing method of a gaming machine.

As illustrated in FIG. 1, a gaming machine 300 includes a slot machine 10 capable of awarding a payout, based on the number of games played. This slot machine 10 also runs, in addition to the base game, a "skill-requiring game" which outputs a result based on an input from the outside. This embodiment will be described with an assumption that the slot machine 10 is an independent slot machine intended for a single player. However, the slot machine 10 may be data-communicably connected to another slot machine 10 so as to form a multiplayer-type machine as a whole, which will be described later.

The slot machine 10 serving as the gaming machine 300 includes, as a first structure: a stop button 70 serving as a first input device which is able to receive an operation from outside; and a controller programmed to execute the following steps of (a1) to (a9).

Step (a1) is a process to run a base game which is started based on betting and awards a base payout according to a result. Step (a2) is a process to count the number of base games having been run. Step (a3) is a process to shift to a first state which is more advantageous for a player than the base game, if the result of the base game satisfies a predetermined condition.

Step (a4) is a process to reset counting of the number of base games if a bonus game has been run;

Step (a5) is a process to shift to a second state which is more advantageous for the player than the base game, if the number of counted base games becomes equal to a first predetermined number. Step (a6) is a process to run, after the second state, a skill-requiring game which outputs a result in accordance with an operation input to the first input device. Step (a7) is a process to increase or decrease a second predetermined number in accordance with a result of the skill-requiring game. Step (a8) is a process to run the base game after the skill-requiring game. Step (a9) is a process to shift to a third state which is more advantageous for the player than the base game, when the number of base games run after the skill-requiring game becomes equal to the second predetermined number of base games after increase or decrease.

Here, the "base game" is a game which is started when a game value is bet, and which awards a base payout according to the result. In the present embodiment, the base game is a slot game in which a plurality of symbols are variably displayed and stopped, and a payout is determined according to the displayed symbols or a combination thereof.

The game value is a coin, bill, or valuable information corresponding to these. Note that the game value in the present invention is not particularly limited. Examples of the game value includes medals, tokens, cyber money, tickets. The ticket is not particularly limited, and a later-mentioned ticket with a barcode may be adopted for example.

Further, "base game count" is a count of unit games each including a series of operations performed within a period between a start of receiving a bet to a point where a winning may be resulted. For example, a BET time for receiving a bet, a game time which lasts until the result is output, and a payout time for a payout process in which a payout is awarded according to the result occur once each within a single unit game.

When the number of base games reaches a "first predetermined number" after the count of the base game is reset, shifting occurs to the second state which is more advantageous for a player. If the number of base games counted after the skill-requiring game reaches the "second predetermined number", shifting occurs to the third state which is more advantageous for a player than the base game. The "second predetermined number" is a value which varies according to the result of the skill-requiring game. For example, in the present embodiment, the default number of "second predetermined number" is "200", and a value "50" is added or subtracted to/from this value according to the result of the skill-requiring game. That is, the "second predetermined number" is increased to "250" or decreased to "150". Further, in the present embodiment, the "first predetermined number" is "600".

The condition for shifting to the third state is not limited to a condition that the number of base games counted after the skill-requiring game reaches the "second predetermined number". The condition may be a condition that the number of base games counted after resetting the count of base games reaches the "second predetermined number". For example, where the default number of the "second predetermined number" is "800", a value of "50" is added or subtracted to/from this value, according to the result of the skill-requiring game. That is, the "second predetermined number" is increased to "850" or decreased to "750". Note that the "first predetermined number" and the "second predetermined number" are not limited to the above number.

The expression "more advantageous state for a player than the base game" means, for example, a greater game value is obtainable than the base game; the chance of obtaining a game value is higher than the base game; and consumption of the game value is less than that in the base game. In the present invention, the "more advantageous state for a player than the base game" means the "first state", the "second state", and the "third state". The present embodiment deals with a case where the "first state" is the "bonus game" in which a free game is repeated. The bonus game is a type of bonus game and is also referred to as "feature game". Further, in the present embodiment, the "second state" and the "third state" are each a state where a payout is awarded. Note that a state which does not fall under any of the "first state", the "second state", and the "third state" is referred to as the "ordinary state".

A game runnable with a bet of less game values than the base game is referred to as "free game". Note that "bet of less game values" encompasses a bet of zero game value. The "free game" therefore may be a game which is runnable without a bet of game value, and which awards a predetermined amount of payout according to the result. In other words, "free game" is a game which is started without the premise of consuming a game value. On the other hand, the "base game" is a game which is run on condition that a game value is bet, and which awards a predetermined amount of payout according to the result. In other words, "base game" is a game which starts on the premise that a game value is consumed.

Further, the "skill-requiring game" is a game that outputs a result according to an operation input through the first input device after the second state. For example, in the present embodiment, the "skill-requiring game" is a game in which operation of the stop button 70 serving as the first input device causes stop-displaying of a plurality of symbols having been variably-displayed, and an amount of increase/decrease in the "second predetermined number" is determined according to the stop-displayed symbols or a combination thereof. Note that in the skill-requiring game of the present embodiment, the stop-display of the plurality of symbols is controlled upon operation of the stop button 70, and the result of the skill-requiring game having been determined before the start of the skill-requiring game is output.

The slot machine 10 (gaming machine 300) having the above described structure realizes a playing method whereby a payout is awarded based on the number of games played. In other words, the slot machine 10 (gaming machine 300) is operable by a control method that enables awarding of a payout based on the number of games played.

Specifically, a playing method (control method) of the slot machine 10 includes the steps of: running a base game which is started based on betting and awards a base payout according to a result; counting the number of base games having been run; shifting to a first state which is more advantageous for a player than the base game, if the result of the base game satisfies a predetermined condition; resetting counting of the number of base games if shifting to the first state has been done; shifting to a second state which is more advantageous for the player than the base game, if the number of counted base games becomes equal to a first predetermined number; running, after the second state, a skill-requiring game which outputs a result in accordance with an operation input to a first input device which is able to receive an operation from outside; increasing or decreasing a second predetermined number in accordance with a result of the skill-requiring game; running the base game after the skill-requiring game; and shifting to a third state which is more advantageous for the player than the base game, when the number of base games run after the skill-requiring game becomes equal to the second predetermined number of base games after increase or decrease.

With the gaming machine 300 having the first structure or the playing method (control method) executed in the slot machine 10, even if shifting to the first state which is more advantageous for the player than the base game does not occur, shifting to the second state and the third state which are more advantageous for the player than the base game may occur if the player continue to play the base game. This encourages the player to continue to play the game.

In addition to the above, the second predetermined number which indicates the number of games to be played until the shifting to the third state is increased or decreased according to a result of the skill-requiring game run after the second state. This provides a variation in the game so that the entertainment characteristic is enhanced and the player's motivation to continue the game is further increased as he/she expects shifting to the third state.

Further, the slot machine 10 (gaming machine 300) may further include, in addition to the first structure, a second structure having a reporting device, wherein the controller is programmed to carry out a process to notify information based on the number of games until shifting to the third state, in the base game after the skill-requiring game.

According to the slot machine 10 (gaming machine 300) having the second structure, in the base game which is run after the skill-requiring game, the reporting device notifies a the number of games until the shifting to the third state. This allows the player to recognize the second predetermined number which is the result of the skill-requiring game, thereby motivating the player to continue to play the game.

Further, the slot machine 10 (gaming machine 300) may further include, in addition to the first structure and the second structure, a third structure or a fourth structure having a second input device which is able to switch between an insured mode and a non-insured mode, wherein, the controller is programmed to execute the process (a2) only when the insured mode has been set by the second input device.

According to the slot machine 10 (gaming machine 300) having the above third structure or the fourth structure, the process to count the number of base games is carried out only when the insured mode has been set by the second input device which can switch between the insured mode and the non-insured mode. This allows the player to play the game with a desired mode, thereby further enhancing the entertainment characteristic.

For example, when the insured mode requires a higher bet value than the non-insured mode, the player can choose one of: the insured mode in which shifting to an advantageous state occurs based on the number of games played with a high bet value; and the non-insured mode in which the game is playable with a low bet value but shifting to an advantageous state does not occur.

In the first to fourth structure, the first input device of the present invention may function as a maximum bet device which carries out the betting with a maximum bet value in response to an input from the outside, and the maximum bet device may also functions as a second input device.

According to the above structure, a single device is used as the first input device and the second input device, and is able to carry out the betting with a maximum bet value.

(Functional Block of Gaming Machine 300)

Figure 2:
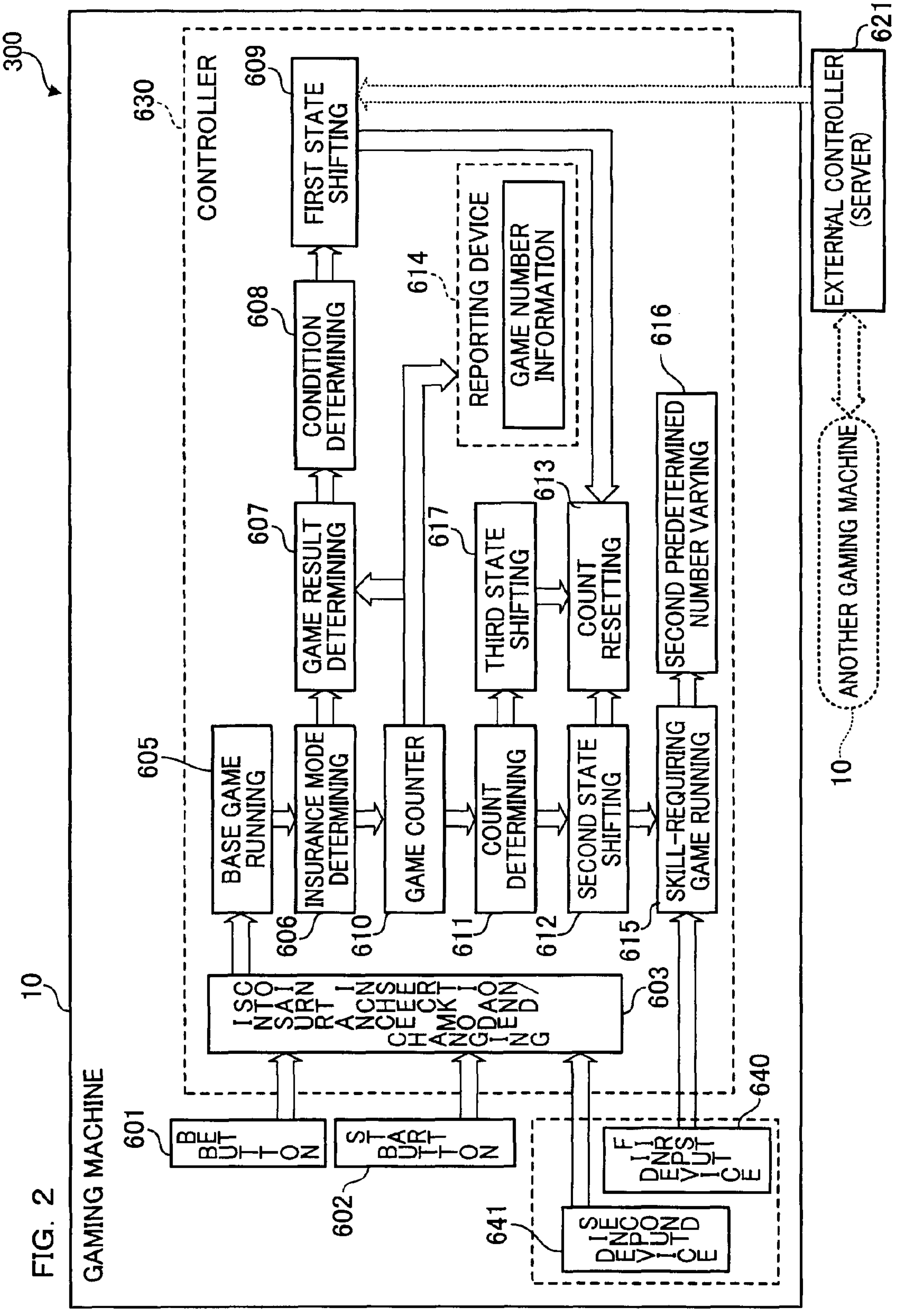
FIG. 2 is a block diagram of the gaming machine.

As illustrated in FIG. 2, the gaming machine 300 structured as described above includes: one or more slot machines 10, and an external control device 621 (server) data-communicably connected to the slot machines 10. The external control device 621 is data-communicably connected to the slot machines 10 installed in a hall. The external control device 621 is for remotely controlling and remotely monitoring an operating condition of each slot machine 10 or a process of changing various set values of a game, for example. Note that, for a multiplayer type, several slot machines 10 and the external control device 621 constitute the gaming machine 300.

The slot machine 10 includes a bet button unit 601, a start button unit 602, a reporting device 614, a first input device 640, a second input device 641, and a game controller 630 which controls these members.

Note that the first input device 640 and the second input device 641 may be a single device having the functions of the both device as in the case of FIG. 2 showing the first input device 640 and the second input device 641 encircled by a broken line. Further, the functions of the devices may be provided to the bet button unit 601.

The bet button unit 601 has a function of accepting operation for entering a bet amount. The start button unit 602 has a function of accepting a player operation for starting a game. The reporting device 614 has a function of notifying information based on the number of games until the shifting to the third state, based on the second predetermined number determined as a result of the skill-requiring game. The first input device has a function of receiving an operation from outside to output a result of the skill-requiring game. The second input device has a function of receiving an operation from outside to switching on and off the counting of the base game (i.e. switching between an insured mode and a non-insured mode).

The game controller 630 has a coin-insertion/start-check-and-insurance-mode-changing unit 603, a base game running unit 605, an insurance mode determining unit 606, a game result determining unit 607, a condition determining unit 608, a first state shifting unit 609, a game counter 610, a count determining unit 611, a second state shifting unit 612, a count resetting unit 613, a skill-requiring game running unit 615, a second predetermined number varying unit 616, and a third state shifting unit 617.

The coin-insertion/start-check-and-insurance-mode-changing unit 603 checks if a coin is inserted and if the start button 602 is operated, and also performs switching between the insured mode and the non-insured mode based on the operation of the second input device.

The base game running unit 605 has a function of running a base game on condition that the bet button unit 601 is operated. The insurance mode determining unit 606 determines whether the base game is in the "insured mode" or the "non-insured mode". The game result determining unit 607 determines whether a result of the base game is related to awarding of a payout. Based on the result of the base game, whether to perform shifting to the first state is determined. The first state shifting unit 609 performs shifting from the base game (ordinary state) to the first state.

The game counter 610 counts the number of unit base games. The count determining unit 611 determines whether the base game is run after the skill-requiring game. If the count determining unit 611 determines that the base game is before the skill-requiring game, the count determining unit 611 determines whether the count has reached the first predetermined number. If the count determining unit 611 determines that the base game is after the skill-requiring game, the count determining unit 611 determines whether the count has reached the second predetermined number.

The second state shifting unit 612 performs shifting from the base game (ordinary state) to the second state. The count resetting unit 613 resets the counted number. The skill-requiring game running unit 615 starts the skill-requiring game, and outputs the result of the skill-requiring game in response to an operation received via the first input device. According to the result of the skill-requiring game, the second predetermined number varying unit 616 increases or decreases the second predetermined number. The third state shifting unit 617 performs shifting from the base game (ordinary state) to the third state.

(Operation of Gaming Machine 300)

Figure 3:
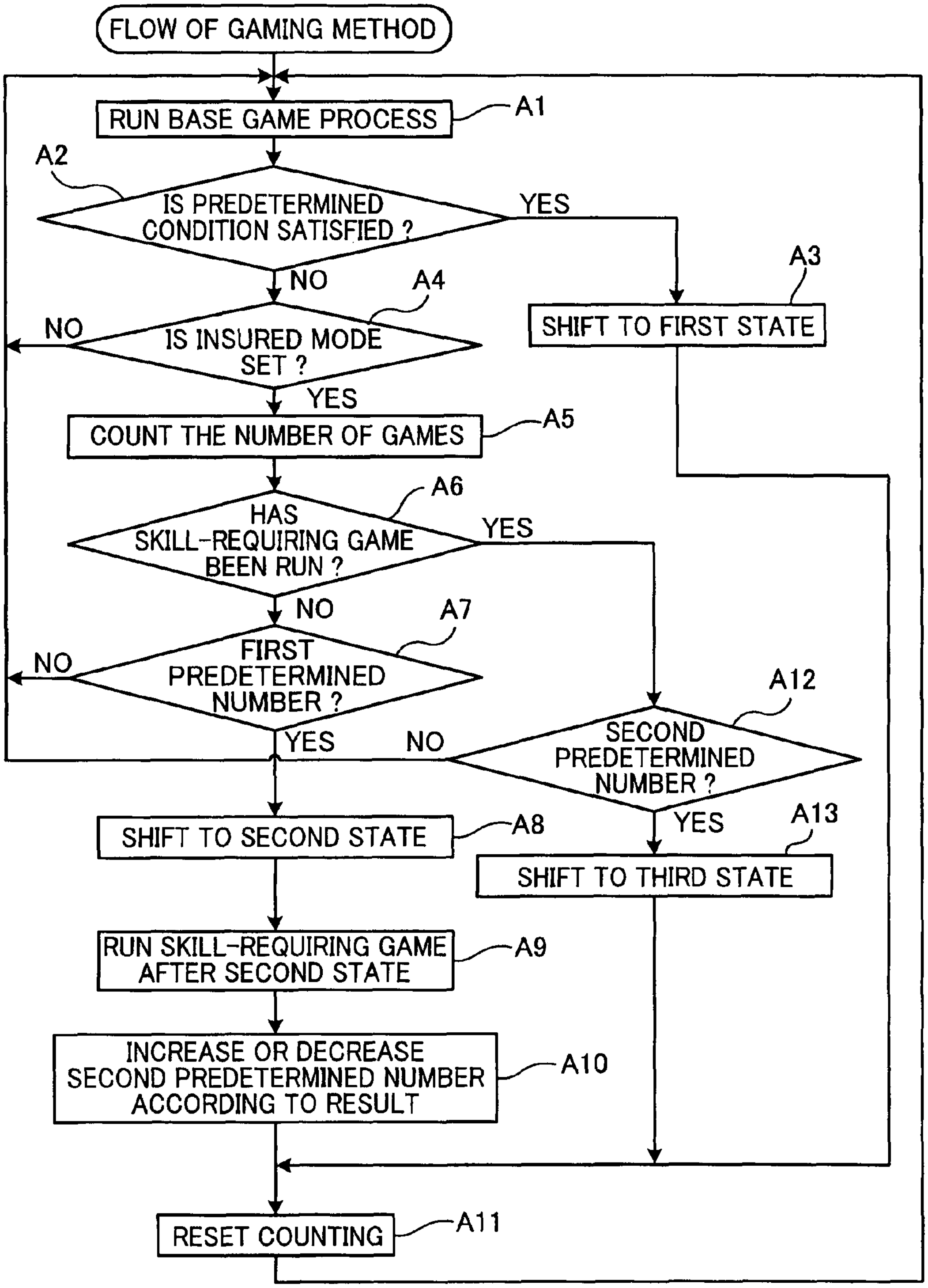
FIG. 3 is a flowchart illustrating the playing method of the gaming machine.

With reference to a flowchart of FIG. 3, the following describes an operation of the gaming machine 300 having the above described functional blocks.

First, a base game is run (A1). Specifically, a series of the following operations are performed.

(Coin Insertion/Start-Checking)

First, the gaming machine 300 checks if the bet button unit 601 is pressed by a player, and if the start button unit 602 is subsequently pressed by the player.

(Result Determination)

Next, the gaming machine 300 performs a process of determining the result of the base game, when the player presses the start button unit 602. For example, in cases of slot games, the gaming machine extracts random values for symbol determination, and determines symbols to be displayed at the time of stopping scrolling of symbol columns for the player, for a plurality of respective video reels displayed to a display. Next, the gaming machine 300 starts scrolling the symbol columns on the video reels, and stops the scrolling so as to present to the player the selected symbols.

(Winning Determination)

Next, the gaming machine 300 determines whether the result of the base game is associated with awarding of a payout. For example, in cases of slot games, when the symbol column of each video reel stops scrolling, the gaming machine determines whether a combination of the symbols presented to the player yields a winning.

(Payout)

Next, if the result of the payout is associated with awarding of a payout, the gaming machine 300 awards a payout according to the result of the base game. For example, in cases of slot games, when a combination of the symbols presented to the player yields a winning, the gaming machine 300 awards the player a benefit according to the type of the combination of the symbols.

For example, when the combination of symbols presented relates to payout of coins, the gaming machine 300 pays out to the player a predetermined number of coins according to the combination of the symbols.

Next, there is determined whether the result of the base game satisfies a predetermined condition (A2). If the result of the base game satisfies the predetermined condition (A2: YES), shifting occurs to from the base game to the first state which is more advantageous to the player (A3). Then, the counted number of the base games is reset (All), and the process returns to step A1.

On the other hand, when the result of the base game does not satisfy the predetermined condition, there is determined whether or not the game is in the insured mode (A4). If the game is not in the insured mode (A4: NO), that is, if the game is in the non-insured mode, the process returns to step A1. If the game is in the insured mode (A4: YES), the number of games is counted (A5). Specifically, the counted number is incremented by 1.

After that, there is determined whether the current base game is running after the skill-requiring game (A6). if it is determined that the base game is not run after the skill-requiring game (A6: NO), there is determined whether the counted number has reached the first predetermined number (A7). If the counted number has not reached the first predetermined number (A7: NO), the process returns to step A1.

On the other hand, if the counted number has reached the first predetermined number (A7: YES), shifting occurs from the base game to the second state which is more advantageous to the player (A8). After the second state, the skill-requiring game is run (A9). In the skill-requiring game, the result of the skill-requiring game according to an operation input via the first input device is output. Illustration of this however is omitted. Then, according to the result of the skill-requiring game, the second predetermined number is increased or decreased (A10). After that, the counted number is reset (All), and the process returns to step A1.

In step A6, if the current base game is determined as to be after the skill-requiring game (A6: YES), there is determined whether or not the counted number has reached the second predetermined number (A12). The second predetermined number is a resulting value of the increase or decrease in step A10. If the counted number has not reached the second predetermined number, the process returns to step A1. If the counted number has reached the second predetermined number, shifting occurs from the base game to the third state which is more advantageous to the player (A13). After the third state, the counted number is reset (A11), and the process returns to step A1.

As described, the second predetermined number which indicates the number of games to be played until the shifting to the third state is increased or decreased according to a result of the skill-requiring game run after the second state. This provides a variation in the game so that the entertainment characteristic is enhanced and the player's motivation to continue the game is further increased as he/she expects shifting to the third state.

Further, In the base game which is run after the skill-requiring game, the reporting device 614 notifies the number of games until the shifting to the third state. This allows the player to recognize the second predetermined number which is the result of the skill-requiring game, thereby motivating the player to continue to play the game.

Further, the process to count the number of base games is carried out only when the insured mode has been set by the second input device 641 which can switch between the insured mode and the non-insured mode. This allows the player to play the game with a desired mode, thereby further enhancing the entertainment characteristic.

For example, when the insured mode requires a higher bet value than the non-insured mode, the player can choose one of: the insured mode in which shifting to an advantageous state occurs based on the number of games played with a high bet value; and the non-insured mode in which the game is playable with a low bet value but shifting to an advantageous state does not occur.

(Overview of the Present Embodiment)

The slot machine 10 of the present embodiment runs a slot game as the base game, and runs the bonus game (feature game) in which a free game repetitively run, only when the base game satisfies the predetermined condition. That is, the slot machine 10 runs the bonus game (the first state).

Further, in the base game of the insured mode, if the number of unit games played without the bonus game counts 600 times (first predetermined number), a predetermined amount of payout is awarded as a first rescue payout. That is, the slot machine 10 awards a first rescue payout (the second state).

Further, the slot machine 10 runs a symbol stop game as the skill-requiring game after awarding of the first rescue payout. The symbol stop game is a game that stop-displays a plurality of symbols having been variable-displayed, in response to operation of a stop button 70. This is detailed later. The slot machine 10 determines whether to add or subtract 50 to/from the second predetermined number of 200, according to the combination of the symbols stop-displayed. That is, the second predetermined number is determined as to be 250 or 150.

Further, in the base game of the insured mode after the first rescue payout is awarded, a predetermined amount of payout is awarded as the second rescue payout, when the unit game is run without the bonus game a number of times corresponding to the second predetermined number (250 or 150) which is determined as the result of the skill-requiring game. That is, the slot machine 10 awards the second rescue payout (third state).

(Mechanical Structure of Slot Machine 10)

Figure 4:
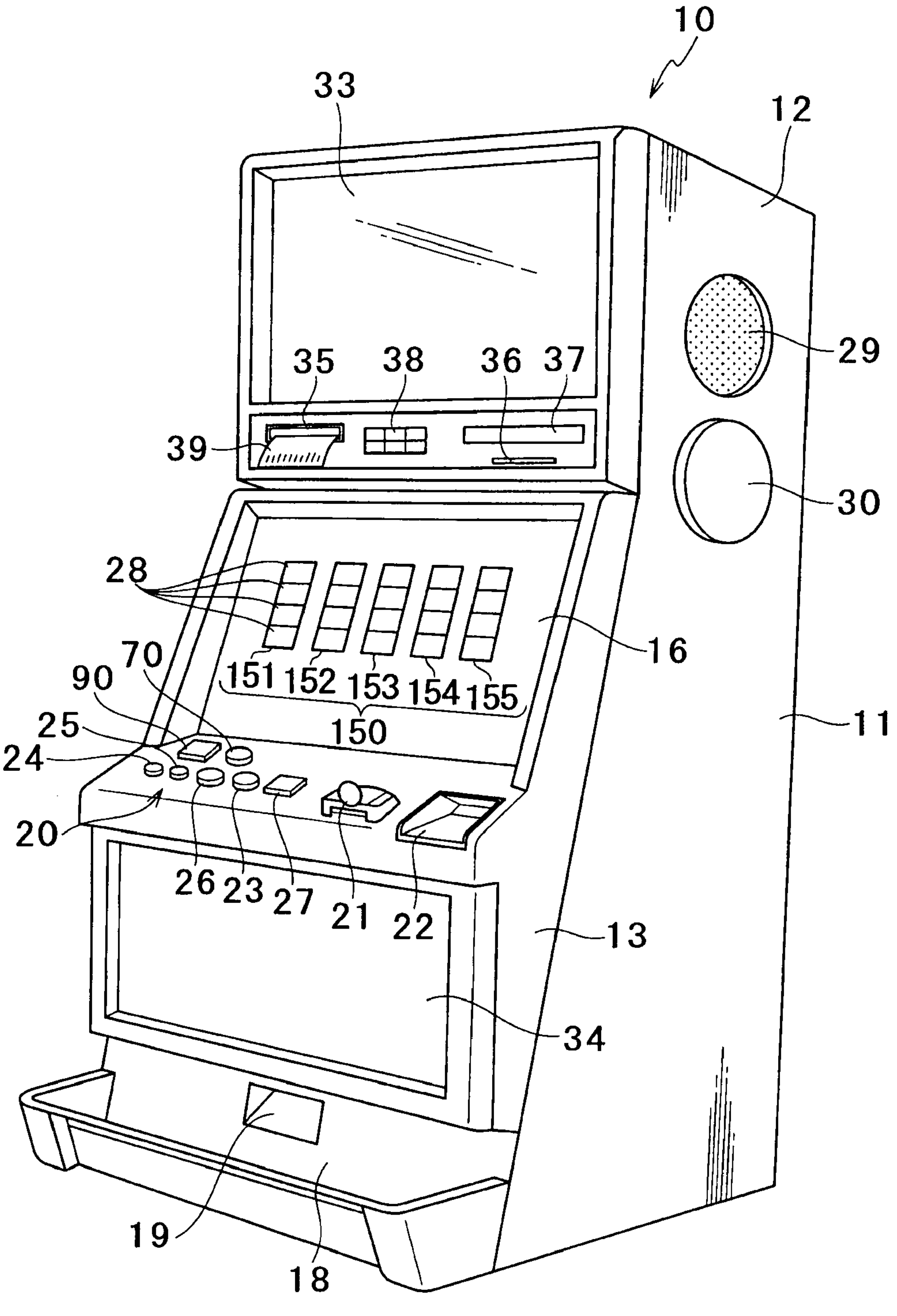
FIG. 4 is a perspective view of a slot machine in the gaming machine.

As shown in FIG. 4, the slot machine 10 includes: a cabinet 11, a top box 12 provided above the cabinet 11, and a main door 13 provided on the front surface of the cabinet 11.

The main door 13 has the symbol display device 16 which is also referred to as lower image display panel. The symbol display device 16 includes a transparent liquid crystal panel. The symbol display device 16 has a display window 150 at its center portion. The display window 150 includes twenty display blocks 28 which are arranged in five columns and four rows. The columns form pseudo reels 151 to 155, each having four display blocks 28. The four display blocks 28 in each of the pseudo reels 151 to 155 are displayed as if all the display blocks 28 are moving downward at various speed. This enables rearrangement, in a manner that symbols 501 respectively displayed in the display blocks 28 are rotated in a longitudinal direction and stopped thereafter.

The symbols 501 include "specific symbols 503" and "ordinary symbols 502". That is, the "symbols 501" is a superordinate conception of the specific symbols 503 and ordinary symbols 502. The specific symbols 503 include a wild symbol 503*a* and a trigger symbol 503*b*. The wild symbol 503*a* is a symbol substitutable for any type of symbols 501. The trigger symbol 503*b* is a symbol serving as a trigger for starting at least a bonus game.

The expression "rearrange" means dismissing an arrangement of symbols 501, and once again arranging symbols 501. "Arrangement" in this specification means a state of symbols 501, which can be visibly confirmed by a player.

Figure 5:
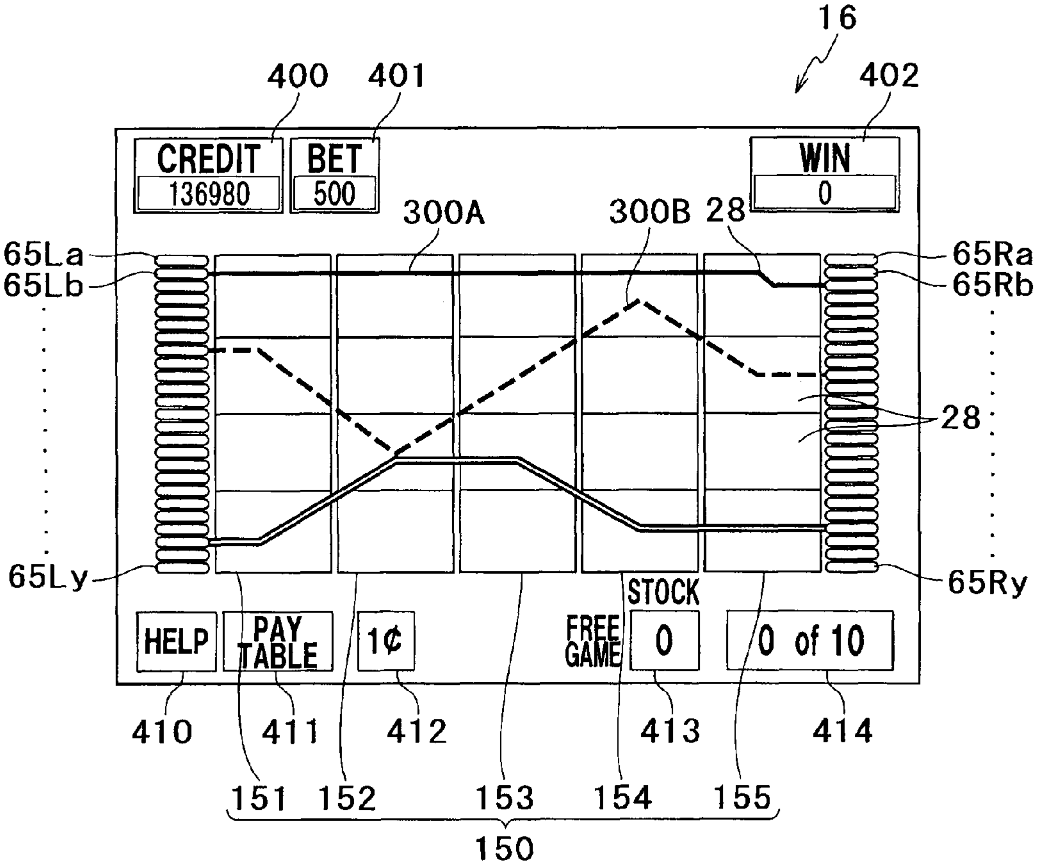
FIG. 5 is an explanatory diagram illustrating a display status of the symbol display device.

On the left and right sides of the display window 150, symmetrically-arranged payline occurrence columns are respectively disposed. As illustrated in FIG. 5, a payline occurrence column on the left when viewed from the front side includes 25 payline occurrence parts 65L (65La to 65Ly).

On the other hand, a payline occurrence column on the right when viewed from the front side includes 25 payline occurrence parts 65R (65Ra to 65Ry).

Each payline occurrence part 65L is paired with one of the payline occurrence parts 65R. Paylines L are prescribed, each extending from one of the payline occurrence parts 65L to one of the payline occurrence parts 65R which are paired with each other. Although there are 25 paylines L in the present embodiment, FIG. 5 only shows three paylines L (payline 300A to 300C) for the sake of easier understanding.

Each payline L is activated when the payline L connects a pair of payline occurrence parts 65L and 65R. The payline L otherwise is inactive. The number of active paylines L is determined based on the bet amount. When the bet amount is the maximum, the maximum number of paylines L (i.e. 25 paylines L) are activated. Each active payline L forms various winning combinations of symbols 501. The winning combination is detailed later.

The present embodiment deals with a case where the slot machine 10 is a video slot machine. However, the slot machine 10 of the present invention may partially adopt a mechanical reel in place of the pseudo reels 151 to 155.

Further, a not-shown touch panel 69 is disposed at the front of the symbol display device 16, and a player is able to input various instructions by operating the touch panel 69. From the touch panel 69, an input signal is transmitted to the main CPU 41.

Below the symbol display device 16 are control panel 20, a coin receiving port 21, and a bill identifier 22. The control panel 20 includes plural buttons 23 to 27, 70, and 90 by which a player is able to input an instruction related to progression of a game. The coin receiving port 21 receives a coin and takes it into the cabinet 11.

The control panel 20 has: a start button 23, a change button 24, a cash-out button 25, a 1-bet button 26, and a maximum bet button 27, a stop button 70, and an insurance bet button 90. The start button 23 is for inputting an instruction to start scrolling symbols. The change button 24 is used when requesting a gaming facility staff member to exchange money. The cash-out button 25 is for inputting an instruction to pay out credited coins to a coin tray 18.

Note that the control panel 20 may structured without the stop button 70 and the insurance bet button 90, and a maximum bet button 27 serving as the maximum bet button 27, the stop button 70, and the insurance bet button 90 may be provided instead.

The 1-bet button 26 is for inputting an instruction to bet a single coin out of the credited coins. The maximum bet button 27 is for inputting an instruction to bet the maximum number of coins bettable in one game (500 coins in this embodiment), out of the credited coins. The insurance bet button 90 is for inputting an instruction to shift from the non-insured mode to the insured mode.

The stop button 70 is for causing stop-displaying of the pseudo reel 151 to 155 scrolled in the skill-requiring game. The skill-requiring game is detailed later.

The bill identifier 22 is for validating the legitimacy of a bill input, and takes into the cabinet 11 a bill recognized as legitimate. The bill identifier 22 may be also capable of reading a barcode on a later-mentioned barcode-attached ticket 39. On the lower front surface of the main door 13, that is, below the control panel 20, there is provided a belly glass 34 with a character or the like of the slot machine 10 being drawn thereon.

On the front surface of the top box 12 is an upper image display panel 33. The upper image display panel 33 has a liquid crystal panel, and displays thereon an image which provides introduction to the game, the rules of the game, or the like.

Further, the top box 12 is provided with speakers 29. Below the upper image display panel 33 are a ticket printer 35, a card reader 36, a data displayer 37, and a key pad 38. The ticket printer 35 prints on a ticket a barcode and outputs the ticket as a barcode-attached ticket 39. A barcode is encoded data containing a credit amount, date, an identification number of the slot machine 10, or the like. A player is able to exchange the barcode-attached ticket 39 with a bill or the like at a predetermined location in the gaming facility (e.g. change booth of a casino).

The card reader 36 reads/writes data from/into a smart card. The smart card is carried by a player, and stores therein data for identifying the player, data relating to a history of games played by the player, or the like. The smart card may store data of coins, bill, or a credit card. Further, it is possible to adopt a magnet stripe card instead of the smart card. The data displayer 37 includes a fluorescent display or the like, and displays the data read by the card reader 36 and the data input by the player through the key pad 38. The key pad 38 is for entering instructions or data relating to issuing of a ticket or the like.

(Electric Structure of Slot Machine 10)

Figure 6:
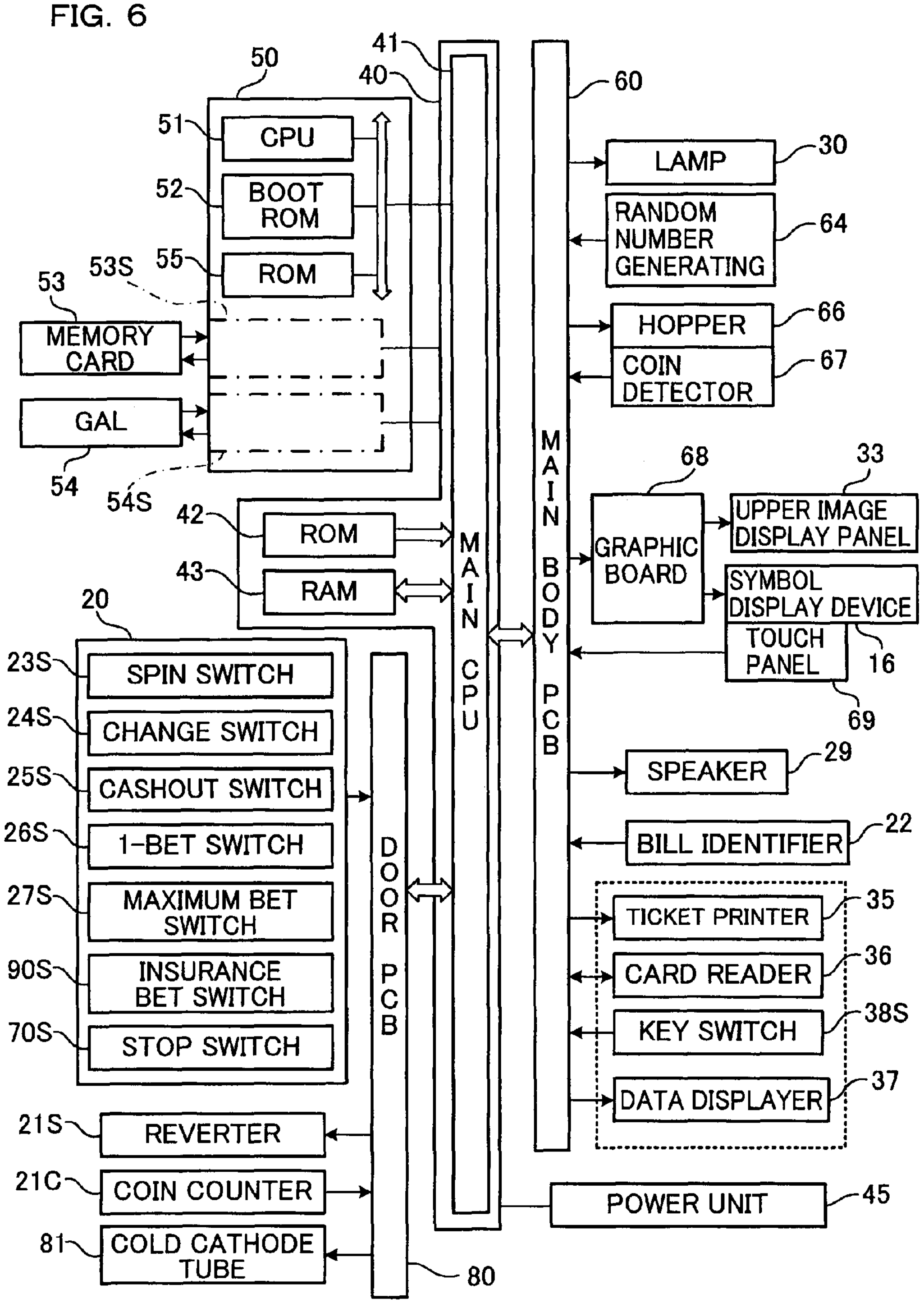
FIG. 6 is a block diagram illustrating a control circuit of the gaming machine.

FIG. 6 is a block diagram illustrating an internal structure of the slot machine 10 illustrated in FIG. 4. The gaming board 50 is provided with a CPU (Central Processing Unit) 51, a ROM 55, a boot ROM 52, a card slot 53S corresponding to a memory card 53, and an IC socket 54S corresponding to a GAL (Generic Array Logic) 54. The CPU 51, the ROM 55, and the boot ROM 52 are connected to one another through an internal bus.

The memory card 53 is made of an involatile memory such as a compact flash (registered trademark) (a) or the like, and stores a game program. The game program includes a symbol determination program. The symbol determination program is a program for determining symbols to be rearranged on the display blocks 28.

The card slot 53S is structured so as to allow the memory card 53 to be attached/detached to/from the card slot 53S. This card slot 53S is connected to the motherboard 40 through an IDE bus. Thus, the type and content of a game run by a slot machine 10 can be modified by detaching the memory card 53 from the card slot 53S, write a different game program into the memory card 53, and inserting the memory card 53 back into the card slot 53S. The game program includes a program according to a game progress.

Further, the game program contains symbol table data indicating a symbol table (see FIG. 7), and an odds data (see FIG. 8), or the like. The symbol table indicates, for each symbol of each symbol column in the display block, a code No. and random values associated. The odds data indicates the amounts of payout corresponding to the type of symbol rearranged on the payline L.

The CPU 51, the ROM 55 and the boot ROM 52 connected through an internal bus are connected to the motherboard 40 through the PCI bus. The PCI bus communicates signals between the motherboard 40 and the gaming board 50 and supplies power from the motherboard 40 to the gaming board 50.

The motherboard 40 is structured by using a marketed general-purpose motherboard which is a printed circuit board having basic components of a personal computer, and includes: a main CPU 41; a ROM (Read Only Memory) 42; and a RAM (Random Access Memory) 43. The motherboard 40 corresponds to the controller of the present invention.

The ROM 42 is made of a memory device such as a flash memory, and stores permanent data and a program such as BIOS (Basic Input/Output System) which is run by the main CPU 41. Running the BIOS by the main CPU 41 initializes predetermined peripherals and starts loading of the game program stored in the memory card 53 via the gaming board 50. Note that, in the present invention, the ROM 42 may be rewritable or non-rewritable.

The RAM 43 stores data used during operation of the main CPU 41 and a program such as the symbol determination program. Further, the RAM 43 is capable of storing the game program. Further, the RAM 43 stores a credit amount, and an input amount and a payout amount for each game (unit game).

Further, the RAM 43 has a bonus game count recording region, a free game count recording region, a total game count recording region, and a total payout amount recording region, and a trigger symbol count recording region. The trigger symbol is also referred to as "feature symbol". In the bonus game count recording region is stored remaining bonus game count data which indicates a remaining bonus game count B. In the free game count recording region is stored remaining free game count data which indicates a remaining free game count T. In the total game count recording region is stored total game count data indicating a total game count C. The total game count C is the number of base games played after shifting to the insured mode. The trigger symbol count recording region stores trigger symbol count data indicating a trigger symbol count. The trigger symbol count is the total number of the trigger symbols that may be rearranged during a free game.

Further, the main RAM 43 is provided with an insurance flag recording region. The insurance flag is set when a rescue start condition is established. The insurance flag recording region is, for example, a recording region of predetermined bits, and the insurance flag is set to "ON" or "OFF" according to contents of the recording region. The insurance flag set to "ON" corresponds to the insured mode. The insurance flag set to "OFF" corresponds to the non-insured mode.

Further, the RAM 43 is provided with a recording region for the counted number. The recording region for the counted number is a recording region of a predetermined bits for example, and indicates the number of unit games until awarding of the rescue payout according to the contents stored in the recording region. In other words, when the counted number indicates "0", the first rescue payout or the second rescue payout is awarded.

Further, the RAM 43 is provided with a recording region for a base game flag indicating the status of the base game. The recording region for the base game flag is a recording region of a predetermined bits, and indicates that the base game flag is either a "first count" or a "second count", according to the contents stored in the recording region.

For example, when the counted number indicates "0" and the base game flag is the "first count", the slot machine 10 awards the first rescue payout. Further, when the counted number indicates "0" and the base game flag is the "second count", the slot machine 10 awards the second rescue payout.

The motherboard 40 is connected to a later-mentioned main body PCB (Printed Circuit Board) 60 and a door PCB 80 via a USB. The motherboard 40 is also connected to a power unit 45.

To the main body PCB 60 and door PCB 80 are connected equipment and devices which generate input signals to be input to the main CPU 41 or which are controlled by control signals output from the main CPU 41. The man CPU 41 runs the game program stored in the RAM 43 based on an input signal input to the main CPU 41, thereby storing a result of a predetermined computation in the RAM or transmitting control signals to the equipment and devices to control the same.

To the main body PCB 60 are connected: a lamp 30, a hopper 66, a coin detector 67, a graphic board 68, a speaker 29, a touch panel 69, a bill identifier 22, a ticket printer 35, a card reader 36, key switches 38S, a data displayer 37, and a random number generating circuit 64. The lamp 30 flashes in a predetermined pattern, based on a control signal output from the main CPU 41.

The hopper 66 is installed inside the cabinet 11, and outputs a predetermined number of coins from the coin payout port 19 to the coin tray 18, based on a control signal output from the main CPU 41. The coin detector 67, when detecting that a predetermined number of coins are output from the coin payout port 19, outputs an input signal to the main CPU 41.

The graphic board 68 controls image displaying on the upper image display panel 33 and the symbol display device 16, based on a control signal output from the main CPU 41. On the upper image display panel 33 and the display blocks 28 of the symbol display device 16 are displayed symbols which are scrolled or stopped. A credit amount display unit 400 of the symbol display device 16 displays thereon a credit amount stored in the RAM 43. Further, a bet amount display unit 401 of the symbol display device 16 displays thereon the number of coins bet. Further, a payout display unit 402 of the symbol display device 16 displays the number of coins paid out. The graphic board 68 is provided with the VDP (Video Display Processor) generating image data based on a control signal outputted from the main CPU 41, the video RAM temporarily storing the image data generated by the VDP, and the like. The image data used at the time of generating image data by the VDP is in the game program which is read out from the memory card 53 and stored in the RAM 43.

The bill identifier 22 validates whether a bill is legitimate, and only receives a legitimate bill into the cabinet 11. The bill identifier 22, when receiving a legitimate bill, outputs an input signal indicating the value of the bill to the main CPU 41. The main CPU 41 stores in the RAM 43 a credit amount corresponding to the value of the bill indicated by the input signal.

Based on a control signal from the main CPU 41, the ticket printer 35 prints on a ticket a barcode and outputs the ticket as a barcode-attached ticket 39. The barcode is encoded data containing the credit amount stored in the RAM 43, date, and the identification number of the slot machine 10. The card reader 36 reads out data from the smart card and transmits the data to the main CPU 41, or writes data into the smart card based on a control signal from the main CPU 41. The key switches 38S are provided to the key pad 38, and outputs a predetermined input signal to the main CPU 41 when a player operates the key pad 38. The data displayer 37 displays data read out by the card reader 36 or data input by the player through the key pad 38, based on a control signal from the main CPU 41.

The random number generating circuit 64 generates a random number at a predetermined timing. Note that random values generated by the random number generating circuit 64 ranges from 0 to 65535.

The door PCB 80 is connected to a control panel 20, a reverter 21S, a coin counter 21C and a cold cathode tube 81. The control panel 20 is provided with a start switch 23S corresponding to the start button 23, a change switch 24S corresponding to the change button 24, a cash-out switch 25S corresponding to a cash-out button 25, a 1-bet switch 26S corresponding to the 1-bet button 26, a maximum bet switch 27S corresponding to the maximum bet button 27, a stop switch 70S corresponding to the stop button 70, and an insurance bet switch 90S corresponding to the insurance bet button 90. Each of the switches 23S to 27S, 70S, and 90S outputs an input signal to the main CPU 41 when corresponding one of the buttons 23 to 27, 70, and 90 is operated by a player.

When the stop button 70 and the insurance bet button 90 are omitted and the maximum bet button 27 also serves as the stop button 70 and the insurance bet button 90, an input signal from the maximum bet button 27 may be received by the maximum BET switch 27S, stop switch 70S, and insurance bet switch 90S.

The coin counter 21C is provided inside the coin receiving port 21, and validates whether a coin input by a player to the coin receiving port 21 is legitimate coin. Any non-legitimate coin is output from the coin payout port 19. Further, the coin counter 21C, when detecting a legitimate coin, outputs an input signal to the main CPU 41.

The reverter 21S operates based on a control signal from the main CPU 41, and delivers coins that are recognized as legitimate by the coin counter 21C into a not-shown cash box or the hopper 66 in the slot machine 10. That is, when the hopper 66 is full of coins, legitimate coins are delivered by the reverter 21S to the cash box. On the other hand, if the hopper 66 is not full of coins, legitimate coins are delivered to the hopper 66. The cold cathode tube 81 functions as a back light disposed at the back sides of the symbol display device 16 and the upper image display panel 33. This cold cathode tube 81 lights based on a control signal output from the main CPU 41.

(Symbols, Combinations, or the Like)

Symbols displayed on the pseudo reels 151 to 155 of the slot machine 10 form symbol columns each including plural symbols 501. Each symbol 501 forming a symbol column is given any of the code Nos. 0 to 19, as shown in FIG. 7. Each symbol column has a combination of symbols 501 which are: "WILD", "FEATURE", "A", "Q", "J", "K", "BAT", "HAMMER", "SWORD", "RHINOCEROS", "BUFFALO", and "DEER".

Figure 9:
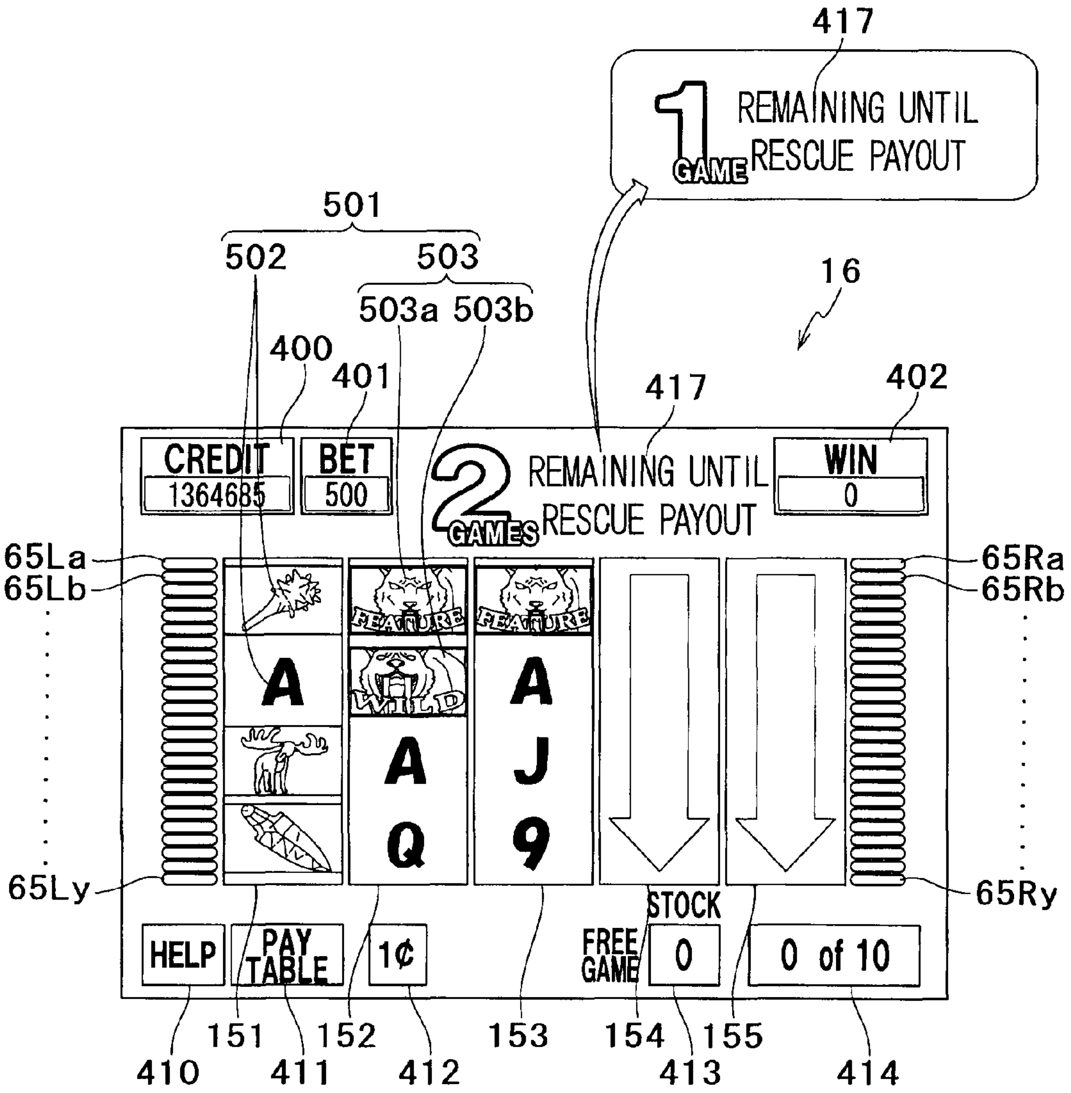
FIG. 9 is an explanatory diagram illustrating a display status of the symbol display device.

As shown in FIG. 9, any three consecutive symbols 501 of a symbol column are displayed (arranged) in the uppermost stage, upper stage, lower stage, and lowermost stage of the corresponding one of the pseudo reels 151 to 155, respectively, thereby forming a symbol matrix of five columns and four rows on the display window 150. Symbols 501 forming a symbol matrix are scrolled when a game is started at least by pressing the start button 23. The scrolling of the symbols 501 stops (symbols 501 are rearranged), when a predetermined period elapses after the start of scrolling.

Further, for symbols 501, various winning combinations are set beforehand. Each winning combination means a winning is achieved. A winning combination is a combination of symbols 501 stopped on the payline L, which is advantageous for a player. The wording "advantageous" means that: a predetermined number of coins according to the winning combination are paid out; the payout number of coins are added to the credit; a bonus game is started; or the like.

In the present embodiment, a winning combination is a combination of symbols 501 which is rearranged on an activated payline L and includes a predetermined number of at least one of the following symbols 501: "WILD", "FEATURE", "A", "Q", "J", "K", "BAT", "HAMMER", "SWORD", "RHINOCEROS", "BUFFALO", and "DEER". When a predetermined type of symbols 501 is set as a scatter symbol, a winning combination is regarded as to be formed if a predetermined number or more of scatter symbols are rearranged, irrespective of the activation/inactivation status of the paylines L.

Specifically, a winning combination with "FEATURE" (a trigger symbol 503*b*) stopped on a payline L serves as a bonus trigger and causes (i) shifting of the gaming mode from the base game to the bonus game and (ii) a payout according to the bet amount. Further, when the winning combination includes a symbol 501 "BAT" stopped on the payline L during the base game, there is paid out an amount of coins (game value) which is a product of a basic payout amount multiplied by the bet amount.

(Symbol Table)

FIG. 7 is a table for use at the time of determining symbols 501 to be rearranged during a base game and a bonus game. The symbol table indicates symbols 501 of each symbol column for the display blocks 28, code Nos. respectively associated with the symbols 501, and twenty number ranges respectively associated with the code Nos. The number ranges cover 0 to 65535.

Note that, in the present embodiment, the symbol table for the bonus game is identical to the symbol table for the base game. However, the symbol table is not limited to this. For example, the symbol table for the bonus game may include a wild symbol 503*a* "WILD" and a trigger symbol 503*b* "FEATURE", in addition to the symbols in the symbol table of the base game. This enhances the player's expectation in the bonus game, and motivates the player to continuously play the game. Note that the wild symbol 503*a* "WILD" and the trigger symbol 503*b* "FEATURE" may be added by replacing symbols in the symbol columns and/or inserting these symbols in the symbol columns.

Note that the above numbers may be equally divided into twenty ranges or unequally divided into twenty ranges. The latter case enables adjustment of a winning possibility for each symbol 501 by adjusting the associated range of random values. Further, the range of random values associated with a specific symbol 503, i.e. "FEATURE" serving as the trigger symbol 503*b* or "WILD" serving as a wild symbol 503*a*, may be narrower than ranges of random values associated with other symbols 501. This allows easier adjustment of winning or losing, by adjusting the possibility of winning of a valuable symbol 501.

For example, when a random number randomly selected for the first column is "10000", the symbol "J" whose code No. "3" is associated with a range of random values including "10000" is selected as a symbol to be rearranged in the first pseudo reel 151. Further, for example, when a random number randomly selected for the fourth column is “40000”, the symbol “FEATURE” whose code No. “12” is associated with a range of random values including “40000” is selected as a symbol to be rearranged in the fourth pseudo reel 151.

(Payout Table)

FIG. 8 is a payout table for managing payout awarded based on the winning combination. This payout table is stored in the RAM 43 of the motherboard 40, and payout information (payout multiplying factor) is associated with each winning combination. For example, a payout multiplying factor corresponding to a winning combination including three “A” is “4”. Therefore, a payout calculated by multiplying a bet amount by 4 is awarded to a player in this case. A payout multiplying factor corresponding to a winning combination including five “BUFFALO” is “100”. Note that the payout multiplying factor for the base game is the same as that of the free game; however, the present invention is not limited to this. That is, the payout multiplying factor may be different between the base game and the free game.

(Display Status)

The following describes an exemplary display status of the symbol display device 16 in the operation of the slot machine 10.

(Base Game Screen: During Game)

FIG. 9 shows an exemplary base game screen which is a screen displayed on the symbol display device 16, during the base game.

More specifically, the base game screen is arranged in a center portion, and includes: the display window 150 having the five pseudo reels 151 to 155, and the payline occurrence parts 65L and 65R which are arranged on both sides of the display window 150 and symmetrical with respect to the display window 150. Note that FIG. 9 shows a base game screen in which the first to third pseudo reels 151, 152, and 153 are stopped, while the fourth and fifth pseudo reels 154 and 155 are rotating.

Above the display window 150 are: the credit amount display unit 400, the bet amount display unit 401, and the payout display unit 402. These units 400, 401, and 402 are sequentially arranged in this order from the left side to the right side when viewed from a player.

The credit amount display unit 400 displays a credit amount. The bet amount display unit 401 displays a bet amount in a unit game in progress. The payout display unit 402 displays the number of coins to be paid out when a winning combination is achieved.

Below the display window 150 are: a help button 410; a pay-table button 411; a bet unit display unit 412; a stock display unit 413; and a free game count display unit 414. These units 410, 411, 412, 413, and 414 are sequentially arranged in this order from the left side to the right side when viewed from the player.

The help button 410, when pressed by a player, activates a help mode. The help mode provides a player with information to solve his/her problem regarding the game. The pay-table button 411, when pressed by a player, activates a payout display mode in which an amount of payout is displayed. The payout display mode displays an explanatory screen indicating relation of a winning combination to the payout multiplying factor.

The bet unit display unit 412 displays a bet unit (payout unit) at the current point. With the bet unit display unit 412, the player is able to know that, for example, the minimum game value required to participate in a unit game is one cent, and that he/she is able to raise his/her bet in increments of one cent.

The stock display unit 413 displays a bonus game carry-over number. Here, the “number of bonus games carried over” means the remaining number of bonus games runnable subsequently to an end of the currently-run bonus game. That is, when the stock display unit 413 displays “3”, three more bonus games are runnable after the currently-run bonus game. Note that “0” is displayed during the base game.

The free game count display unit 414 displays the total number of times the bonus game is to be repeated, and how many times the bonus game has been repeated. That is, when the free game count display unit 414 displays “0 OF 0”, the total number of times a free game is to be repeated (“free game total number”) is 0; that is, the game in progress is not a bonus game. Further, when the free game count display unit 414 displays “5 OF 8”, during the bonus game, the free game total number is eight, and the current game in progress is the fifth free game.

Further, between the bet amount display unit 401 and the payout display unit 402 is arranged a rescue display unit 417. The rescue display unit 417 displays the unit game number until awarding of the rescue payout, which number is indicated by the counted number stored in the RAM 43. For example, where the rescue display unit 417 displays “2 GAMES REMAINING UNTIL RESCUE PAYOUT” as shown in FIG. 9, running of another unit game will cause the rescue display unit 417 to display “1 GAME REMAINING UNTIL RESCUE PAYOUT”, as is shown at the upper right of FIG. 9.

Note that, when the base game is in the “non-insured mode”, no display is performed in relation to the rescue display unit 417. That is the display of the rescue display unit 417 indicates that the base game is in the “insured mode”.

The present embodiment deals with a case where the number of unit games until awarding of the rescue payout is displayed for both of the first rescue payout and the second rescue payout. However, the present embodiment is not limited to this. For example, the number of unit games until awarding of the rescue payout may be displayed for only one of the first rescue payout and the second rescue payout. A structure in which the number of unit games until the rescue payout is not displayed is also possible.

(Bonus-Win Screen in Base Game)

Figure 10:
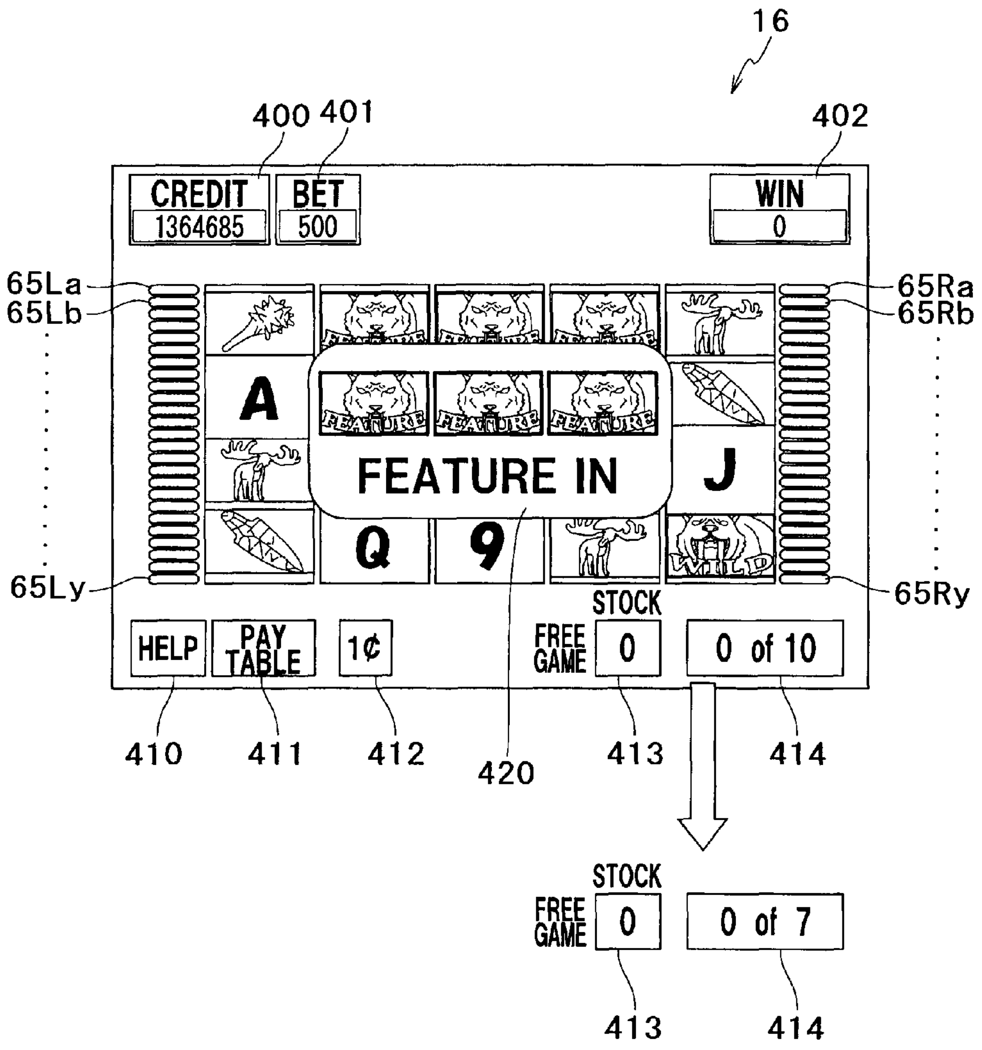
FIG. 10 is an explanatory diagram illustrating a display status of the symbol display device.

FIG. 10 shows a screen displayed for a predetermined period after a winning of bonus. More specifically, the screen shows that a bonus is won with three trigger symbols **503*b* being rearranged. The trigger symbol 503*b*** preferably has a readable text such as “FEATURE”, so as to have a player clearly understand the symbol relates to a winning of bonus.

On this screen, a bonus-win screen 420 is pop-up displayed which notifies a player of the winning of bonus using a symbol image and an image of text of “FEATURE IN”. Then, at the same time or immediately after displaying the bonus-win screen 420, the free game total number “0” of the free game count display unit 414 is switched to “7”. Thus, the player is able to know that he/she has won a bonus, and that the game will transit to a bonus game in which the free game is repeated seven times.

Further, the count of the base games is reset upon start of the bonus game. Therefore, a reset comment 418 is pop-up displayed on this screen.

(Bonus Game Screen: During Game)

Figure 11:
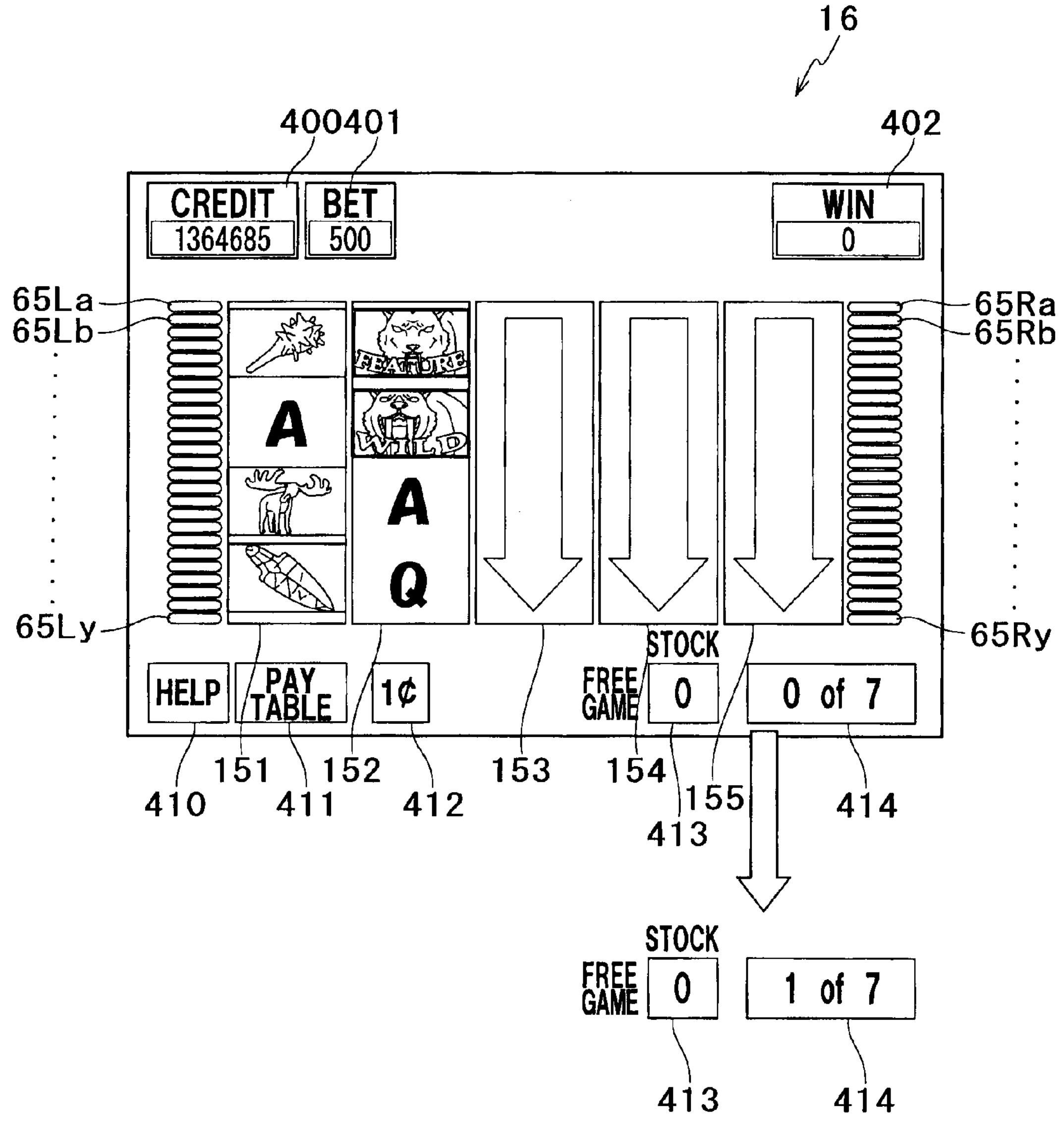
FIG. 11 is an explanatory diagram illustrating a display status of the symbol display device.

FIG. 11 illustrates an exemplary bonus game screen which is a screen displayed on the symbol display device 16, during the bonus game.

Specifically, the free game count display unit 414 displays the free game total number and the what number game the current game is. For example, the free game count display unit 414 indicates that the first free game out of seven free games is running. Further, during the bonus game, the unit game is not counted. Other operations are the same as the base game.

(Rescue Payout Screen)

Figure 12:
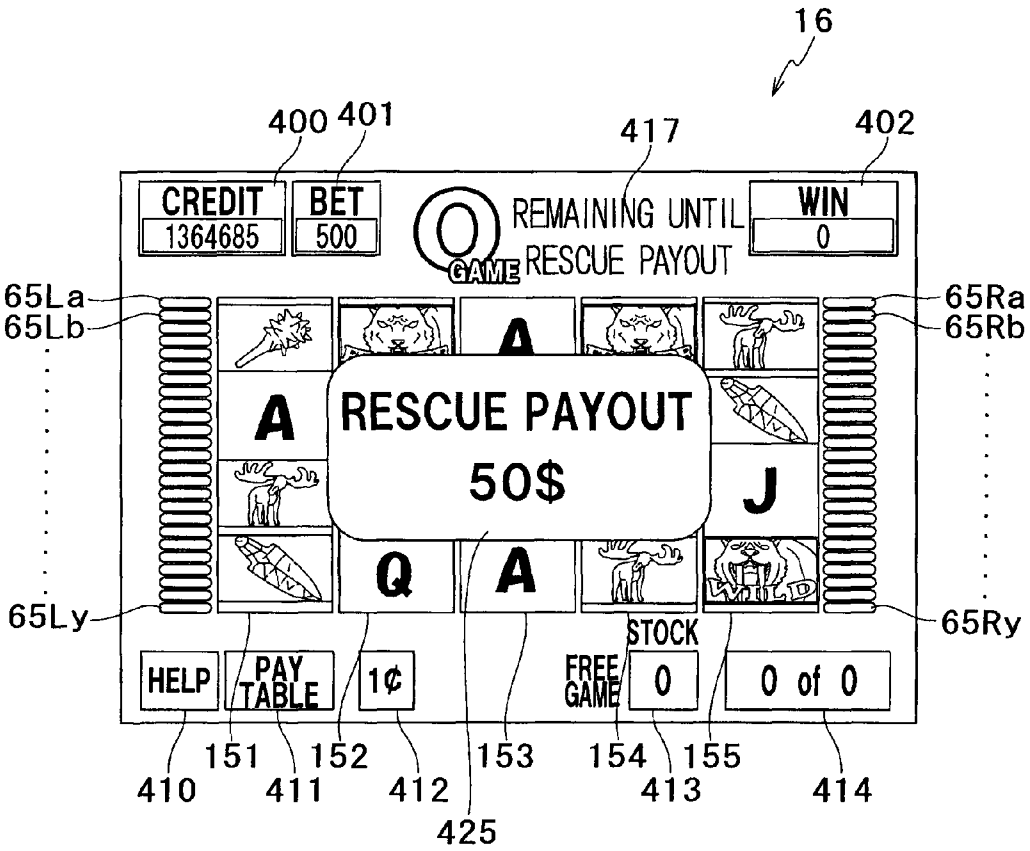
FIG. 12 is an explanatory diagram illustrating a display status of the symbol display device.

FIG. 12 shows a display screen at the start of the first rescue payout or the second rescue payout. Specifically, this rescue payout screen is displayed at the timing when the rescue start condition is satisfied by the number of base games reaching the first predetermined number (600 times in the present embodiment) or by the number of base games after the skill-requiring game reaching the second predetermined number (250 times or 150 times in the present embodiment). On the rescue payout screen, a rescue payout notifying screen 425 is pop-up displayed for a predetermined period. On the rescue payout notifying screen 425, there are displayed: text information of "RESCUE PAY" for notifying a player of the start of the rescue process; and information of the amount of payout awarded in the rescue process. Note that, in the present embodiment, the first rescue payout is 50 dollars, and the second rescue payout is 20 dollars. The amount of payout however is not limited to these amounts. For example, both of the first rescue payout and the second rescue payout may be 50 dollars. Further, different rescue payout screens may be used for the first rescue payout and the second rescue payout, respectively.

(Skill-Requiring Game Start Screen)

Figure 13:
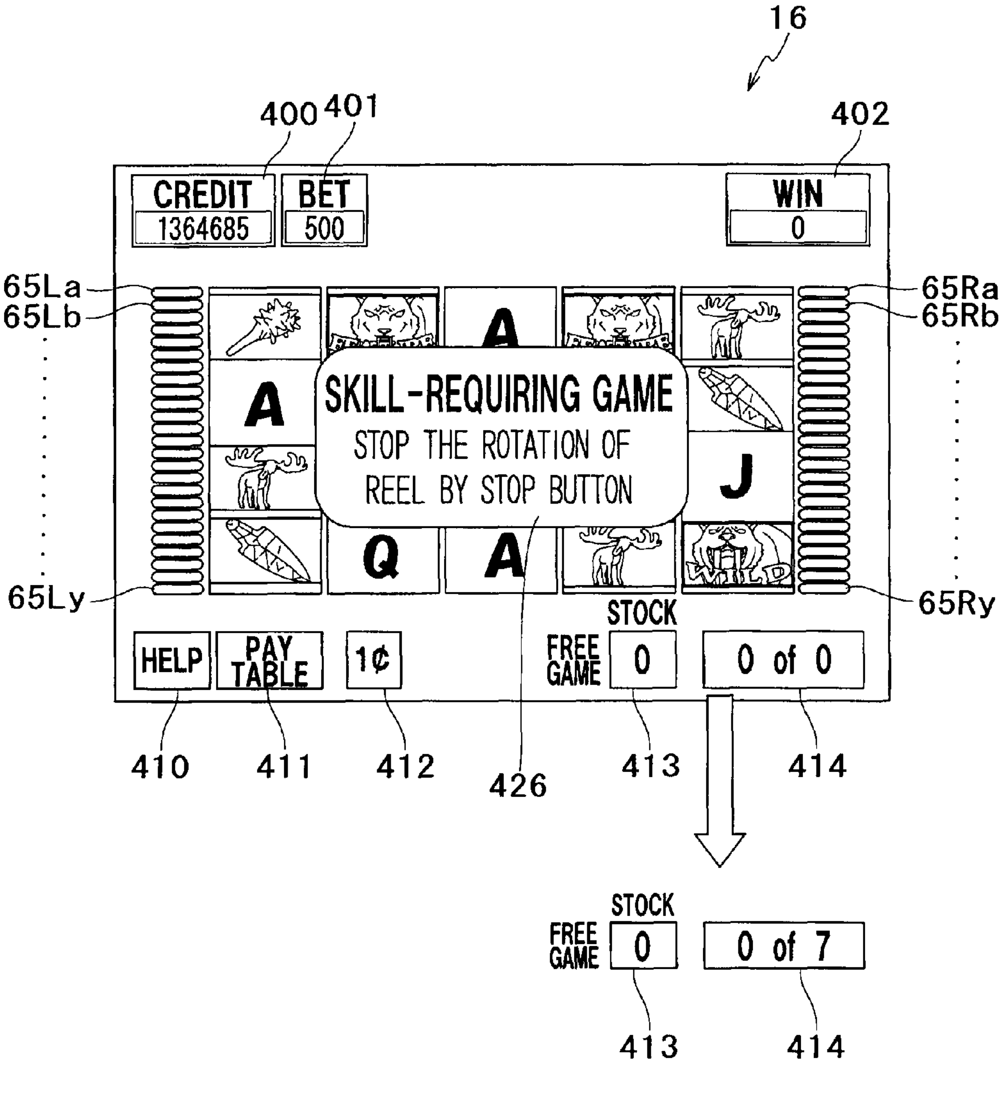
FIG. 13 is an explanatory diagram illustrating a display status of the symbol display device.

FIG. 13 shows a screen displayed for a predetermined period after awarding of the first rescue payout. Specifically, the screen is a start screen of the skill-requiring game started on condition that the first rescue payout is awarded. In the start screen of the skill-requiring game, the skill-requiring game start reporting screen 426 is pop-up displayed for a predetermined period of time. The skill-requiring game start reporting screen 426 displays text information reading "SKILL-REQUIRING GAME" for notifying of the start of the skill-requiring game, and text information reading "STOP THE ROTATION OF REEL BY STOP BUTTON" which is an instruction for the skill-requiring game.

(Skill-Requiring Game Screen: During Game)

Figure 14:
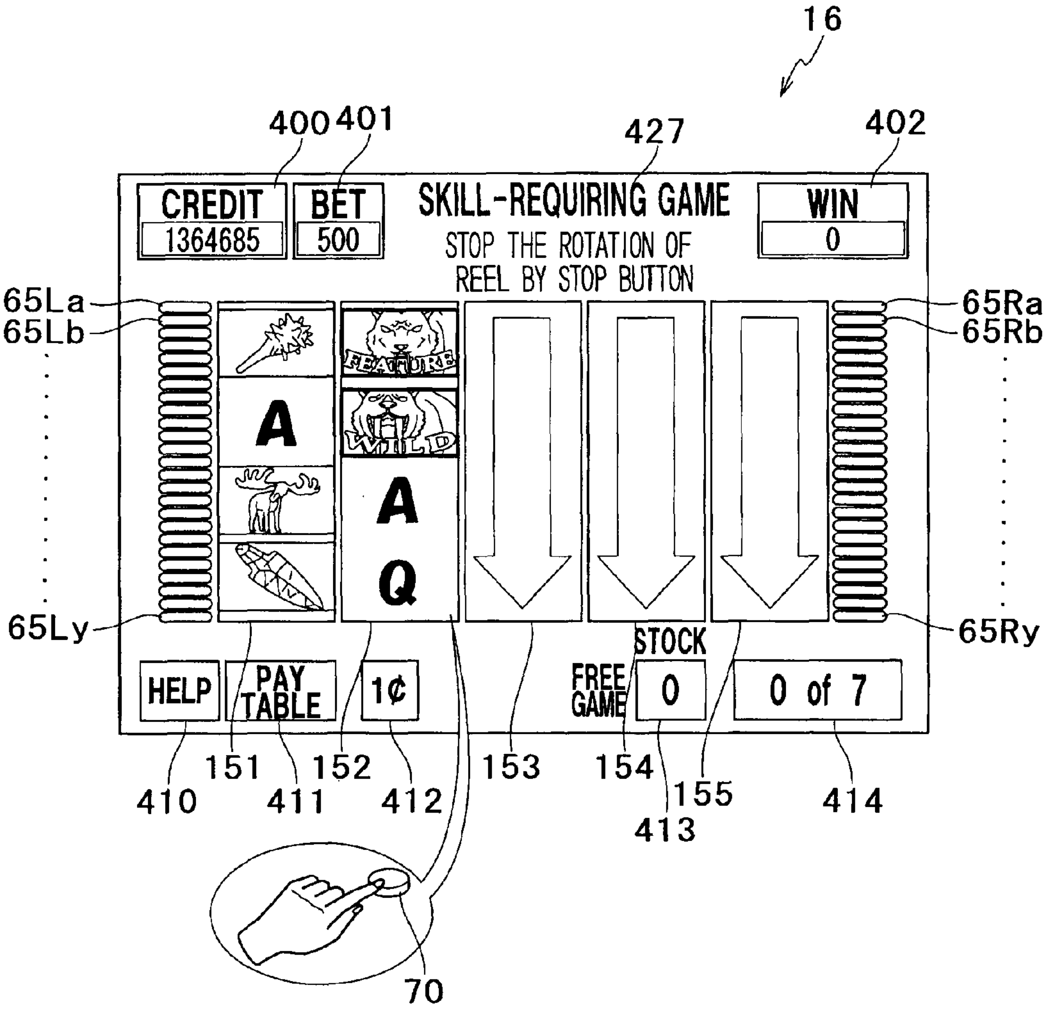
FIG. 14 is an explanatory diagram illustrating a display status of the symbol display device.

FIG. 14 illustrates an exemplary skill-requiring game screen which is a screen displayed on the symbol display device 16, during the skill-requiring game.

When the skill-requiring game is started, the symbols of the five pseudo reels 151 to 155 are rotated as in the case of the base game. The skill-requiring game screen displays, as a skill-requiring game reporting image 427, text information reading "SKILL-REQUIRING GAME" which indicates that the skill-requiring game is running; and text information reading "STOP THE ROTATION OF REEL BY STOP BUTTON" which is an instruction for the skill-requiring game.

In the base game, rotation of the pseudo reels 151 to 155 is automatically stopped upon elapse of a predetermined period. In the skill-requiring game however, the rotation of the pseudo reels 151 to 155 is stopped when the stop button 70 is operated. Specifically, every time the stop button 70 is operated from outside, the pseudo reels 151 to 155 are sequentially stopped from the pseudo reel 151 in the first column to the pseudo reel 155 in the fifth column.

In the example of FIG. 14, the stop button 70 is operated twice, and rotation of the pseudo reels 151 and 152 respectively in the first and second columns are stopped, while the pseudo reels 153, 154, and 155 respectively in the third, fourth, and fifth column are still rotating. Note that it is possible to perform a control so that the rotation of the reels automatically stops upon elapse of a predetermined period, when, for example, the stop button 70 is not operated.

(Skill-Requiring Game Screen: Displaying Result)

Figure 15:
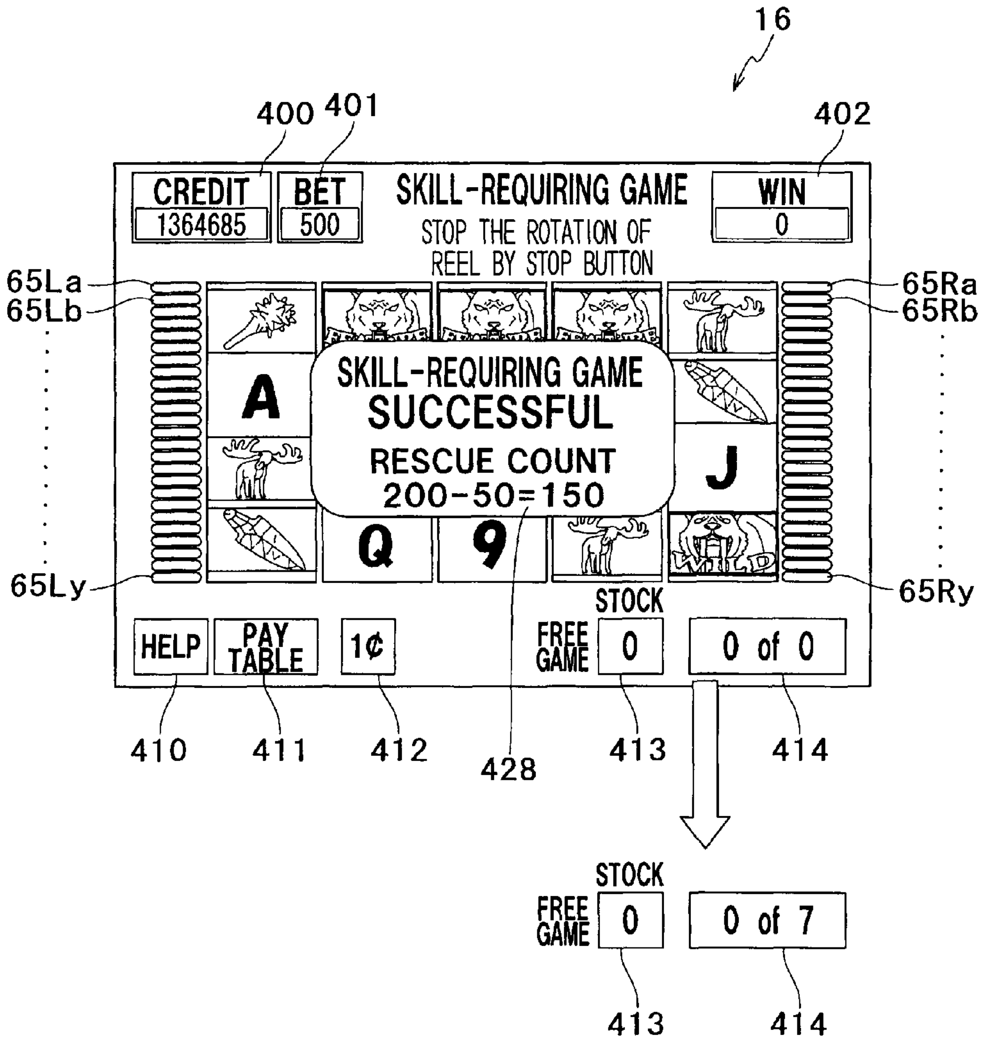
FIG. 15 is an explanatory diagram illustrating a display status of the symbol display device.

FIG. 15 shows a skill-requiring game result displaying screen displayed after all the pseudo reels 151 to 155 are stopped rotating in the skill-requiring game. In the skill-requiring game result displaying screen, a skill-requiring game result reporting screen 428 is pop-up displayed. The skill-requiring game result reporting screen 428 displays text information indicating whether or not the result of the skill-requiring game is a success, and text information indicating the second predetermined number.

In the skill-requiring game, whether or not the result is a success is determined based on whether or not any of the winning combinations in FIG. 8 is achieved on each payline L. Note that the symbol "WILD" can substitute other symbols, as is the case of the base game.

When the result of the skill-requiring game is a success, the skill-requiring game result reporting screen 428 displays: text information reading "SKILL-REQUIRING GAME SUCCESSFUL" which indicates the result of the skill-requiring game; text information reading "RESCUE COUNT 200−50=150" which indicates the second predetermined number, as shown in FIG. 15.

When the result of the skill-requiring game is not a success (i.e., failure), the skill-requiring game result reporting screen 428 displays: text information reading "SKILL-REQUIRING GAME FAILED" which indicates the result of the skill-requiring game; and text information reading "RESCUE COUNT 200+50=250" which indicates the second predetermined number (not shown).

Note that the determination of the result of the skill-requiring game is not limited to the above. Further, the increase and decrease of the second predetermined number is not limited to the above. For example, the number to be subtracted from the second predetermined number may be increased or decreased according to the winning combination achieved.

For example, where the result of the skill-requiring game is a success, the second predetermined number may be decreased by 50 if three of the same type of symbols are on any payline, by 70 when four of the same type of symbols are on any payline, and by 100 when five of the same type of symbols are on any payline.

(Operation of Slot Machine 10: Base Game Running Process)

Figure 16:
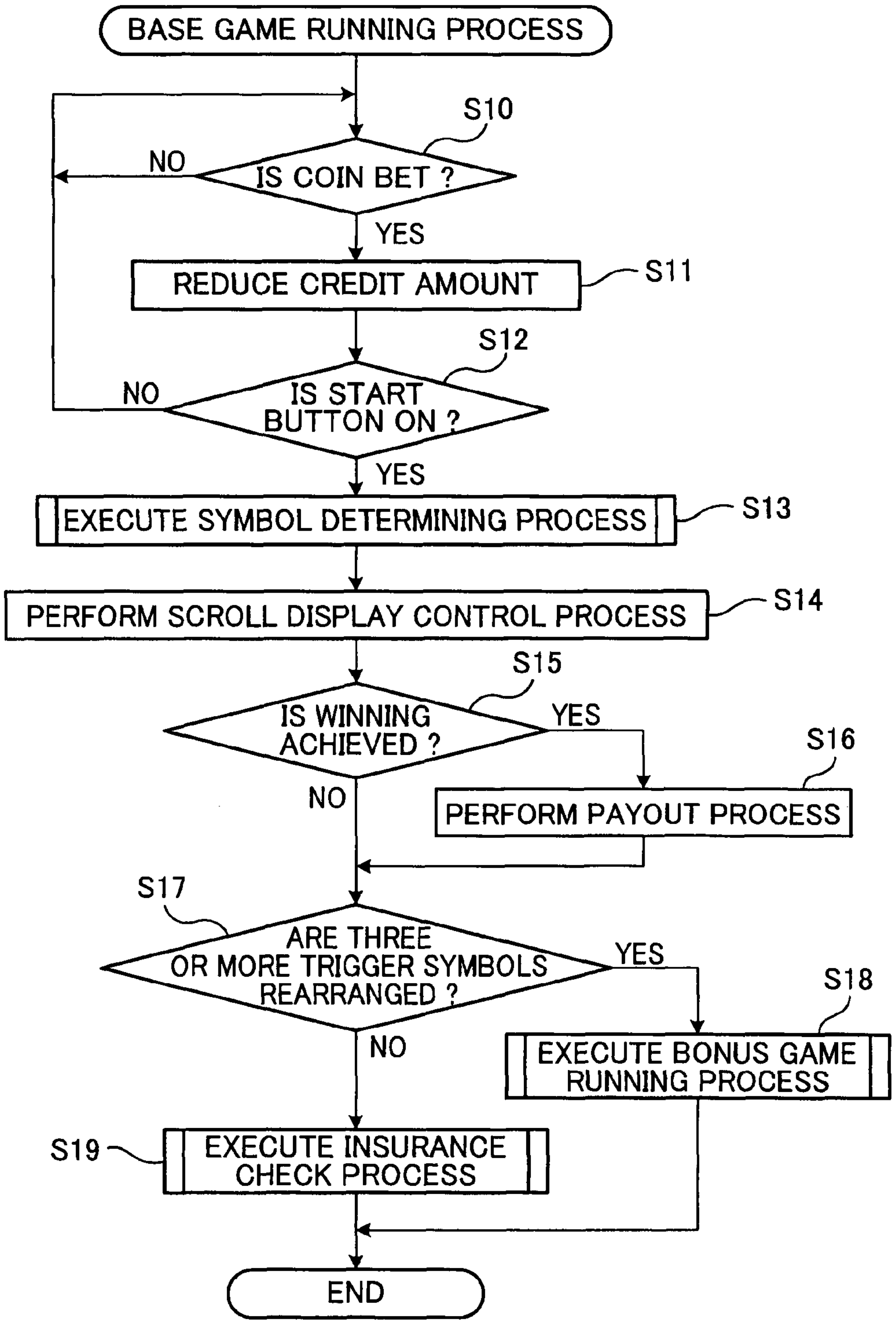
FIG. 16 is a flowchart illustrating a base game running process.

The following describes an operation of the slot machine 10 having the above structure, with reference to FIGS. 16 to 22. The base game running process shown in FIG. 16 is run by the main CPU 241 of the slot machine 10. One routine shown in FIG. 16 constitute a unit game. Note that, the slot machine 10 is started before this process.

As shown in FIG. 16, the main CPU 41 determines whether a coin is bet (S10). In this process, the main CPU 41 determines whether an input signal is received. The input signal may be an input signal output from the 1-bet switch 26S when the 1-bet button 26 is operated, or an input signal output from the maximum bet switch 27S when the maximum bet button 27 is operated. When it is determined that no coin is bet, the process goes back to S10.

On the other hand in S10, if it is determined that a coin is bet, the main CPU 41 performs a process of reducing the credit amount stored in the RAM 43, by the amount of coins having been bet (S11). Note that when the number of coins bet surpasses the credit amount stored in the RAM 43, the process of reducing the credit amount in the RAM 43 is not performed and the process goes back to S10. Further, if the number of coins bet surpasses the maximum number of coins bettable in one game (500 coins in this embodiment), the process of reducing the credit amount in the RAM 43 is not performed and the process goes to S12.

Next, the main CPU 41 determines whether the start button 23 is turned on (S12). In this process, the main CPU 41 determines whether an input signal is received, which signal is output from the start switch 23S when the start button 23 is turned on. If it is determined that the start button 23 is not turned on, the process goes back to S10. Note that when the start button 23 is not turned on (e.g. when the start button 23 is not turned on, and an instruction to end the game is input), the main CPU 41 cancels the result from the reduction in S11.

On the other hand in S12, when it is determined that the start button 23 is turned on, the main CPU 41 executes a symbol determining process (S13). In the base game symbol determining process, the main CPU 41 runs the symbol determination program stored in the RAM 43 to determine a code No. at the time of stopping the symbols. Specifically, the main CPU 41 obtains a random number, and determines the code No. for each symbol column at the time of stopping symbol columns in the display blocks 28, based on the random number obtained, and the base game symbol table of FIG. 6. The base game symbol determining process is detailed later with reference to the drawings.

As illustrated in FIG. 6, there are 14 wild symbols (also referred to as specific symbols) in the symbol table. The wild symbol is a symbol substitutable for any symbol.

Next, in S14, the main CPU 41 performs a scroll display control process. As illustrated in FIG. 16, this process controls displaying so that symbols determined in S13 are rearranged after scrolling of symbols is started.

Next, the main CPU 41 determines whether a winning is achieved (S15). In S15, the main CPU 41 counts the number of each type of symbols rearranged along the same payline L in S14. Then, the main CPU 41 determines if there is a counted value which equals or surpasses "2".

When it is determined that a winning is achieved, the main CPU 41 performs a process related to coin payout (S16). In this process, the main CPU 41 refers to the odds data stored in the RAM 43, and determines the payout multiplying factor based on the number of certain symbols rearranged along a payline L. The odds data is data indicating the number of certain symbols rearranged along a single payline L and the associated payout multiplying factor (See FIG. 14). Note that the payout is doubled every "WILD" arranged on a winning-achieved payline L. That is, if three "WILD" symbols are displayed along the winning-achieved payline L, the payout is eight times as much of the original payout amount.

The present embodiment deals with a case where it is determined that a winning is achieved when symbols arranged along a single payline L includes at least two symbols of the same type. The present embodiment however is not limited to this. For example, the paylines may be omitted from the present invention, and it is possible to determine that a winning is achieved when symbols rearranged in the display blocks 28 includes at least two symbols of the same type.

When it is determined that a winning is not achieved in S15, or after the process of S16, the main CPU 41 determines whether three or more trigger symbols 503*b* are rearranged (S17). In this process, whether or not three or more trigger symbols 503*b* are rearranged in the display blocks 28 is determined, without taking into consideration the paylines L. In S17, when it is determined that three or more trigger symbols 503*b* are rearranged as illustrated in FIG. 10, the main CPU 41 executes a bonus game running process (S18). In the bonus game running process is run a free game. The bonus game running process is detailed later.

When it is determined that the number of trigger symbols 503*b* rearranged is less than three in S17, or after the process of S18, the main CPU 41 executes the insurance check process (S19). This rescue process will be detailed later. After the process of S19, the main CPU 41 ends this sub routine.

(Operation of Slot machine 10: Symbol Determining Process)

Figure 17:
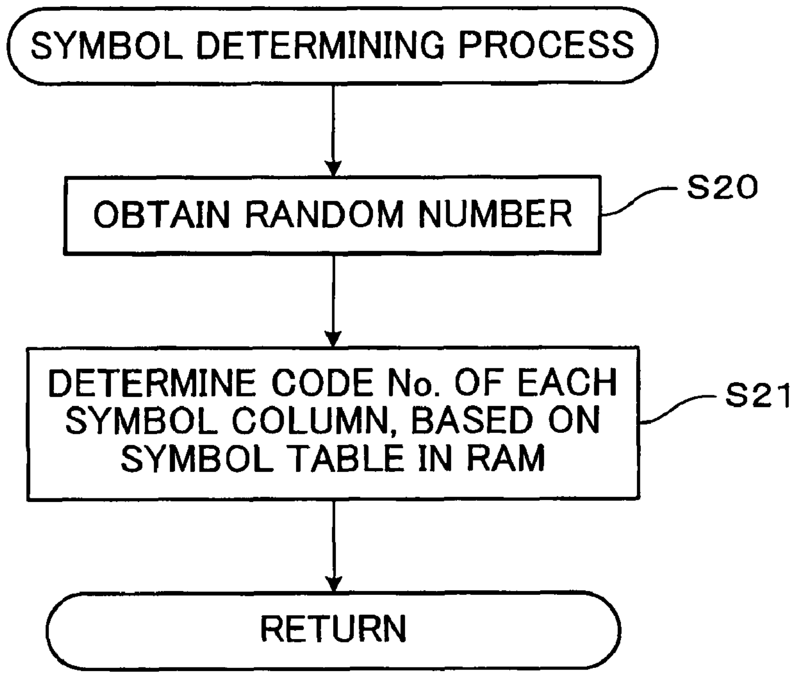
FIG. 17 is a flowchart of a base game symbol determining process.

FIG. 17 is a flowchart showing a sub routine of the symbol determining process. This process is executed by the main CPU 41 running the symbol determination program stored in the RAM 43. First the main CPU 41 obtains random values from the random number generating circuit 64 (S20). In this process, the main CPU 41 obtains five random values corresponding to the symbol columns of the display blocks 28.

Next, the main CPU 41 determines the code No. of each symbol column of the display blocks 28, at the time of stopping the symbols, based on the five random values obtained and the symbol table (S21). For example, when the random number for the first column is 23035, the code No. for the first column is 07. Note that the code No. of the symbol column corresponds to a code No. of a symbol rearranged in the first row of the display blocks 28, amongst those arranged in four rows. After the process of S21, the main CPU 41 ends this sub routine.

The present embodiment deals with a case where the random number generating circuit 64 is provided and a random number is sampled from the random number generating circuit (so-called hardware random number is used). However, the present invention may be adapted so that a random number is generated in a program (so called software random number).

(Operation of Slot Machine 10: Bonus game Running Process)

Figure 18:
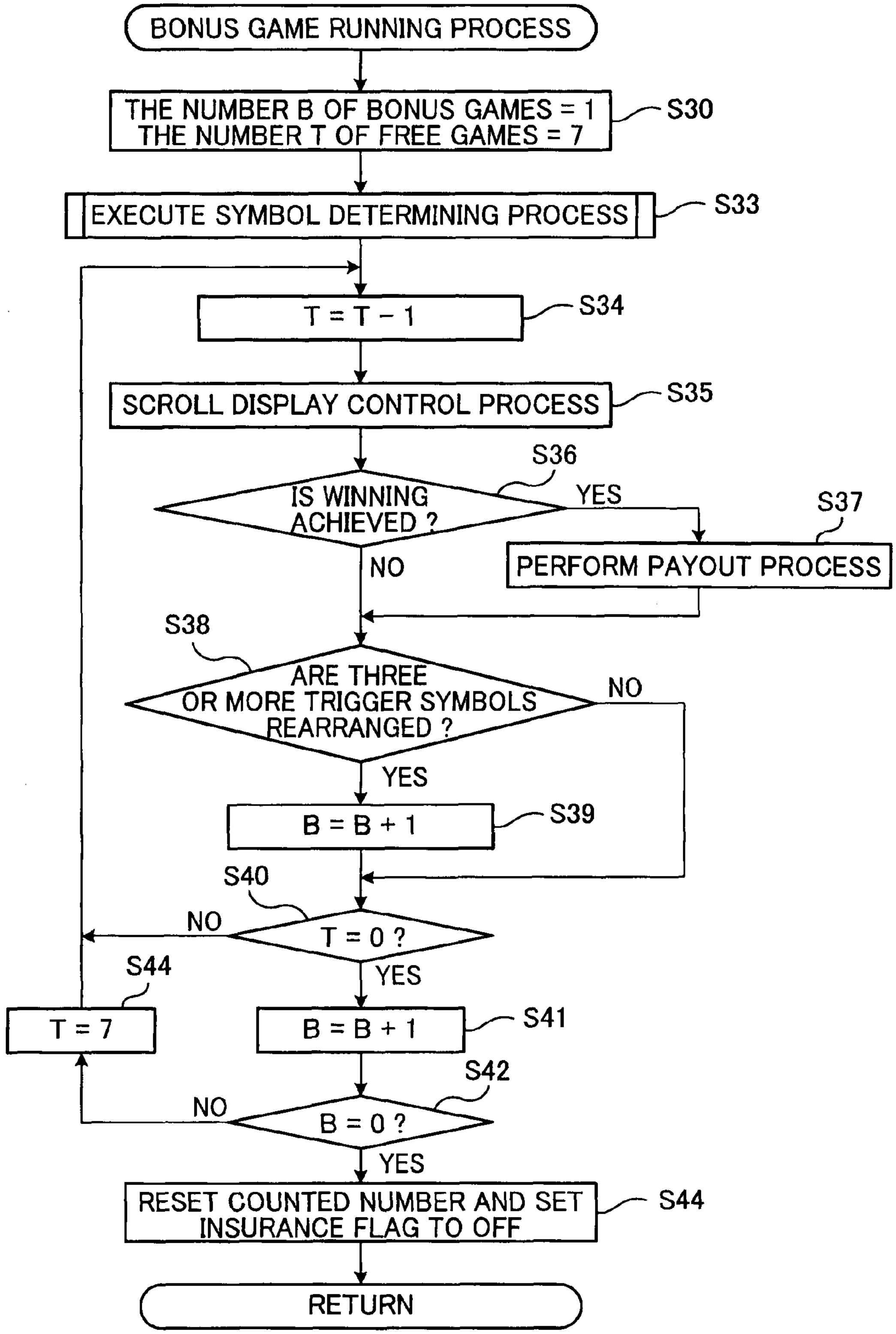
FIG. 18 is a flowchart of a bonus game running process.

Next, the following describes the bonus game running process, with reference to FIG. 18. FIG. 18 is a flowchart showing a flowchart of the sub routine of the bonus game running process. A bonus game is a game which allows the player to play without requiring a bet of a coin.

First, the main CPU 41 sets the remaining bonus game count B in the bonus game count recording region of the RAM 43 to B=1, and sets the remaining free game count T in the free game count recording region of the RAM 43 to T=7 (S30). At this time, the main CPU 41 causes pop-up displaying of the bonus-win screen 420 on the symbol display device 16 (see FIG. 10).

Next, the main CPU 41 executes a symbol determining process described with reference to FIG. 17 (S33). In the base game symbol determining process, the main CPU 41 runs the symbol determination program stored in the RAM 43 to determine a code No. at the time of stopping the symbols. More specifically, the main CPU 41 obtains random values, and determines the code No. of each symbol column of the display blocks 28, at the time of stopping the symbols, based on the random values obtained, and the bonus game symbol table stored in the RAM 43.

Next, in step S34, the main CPU 41 updates the remaining free game count T to T−1 in the RAM 43. Then, in S35, the main CPU 41 performs a scroll display control process. This process is a display control whereby scrolling of symbols is started and symbols determined in S33 are rearranged thereafter. As described, the free game is runnable with consumption of the free game count T stored in the RAM 43.

Next, the main CPU 41 determines whether a winning is achieved (S36). In S36, the main CPU 41 counts the number of each type of symbols rearranged along the same payline L in S35, for each of the paylines L. Then, the main CPU 41 determines if there is a counted value which equals or surpasses “3”.

When it is determined that a winning is achieved, the main CPU 41 performs a process related to coin payout (S37). This process is similar to the process of step S16 which is described in relation to the base game running process of the FIG. 16. Therefore no further description is provided here.

When it is determined that a winning is not achieved in S36, or after the process of S37, the main CPU 41 determines whether three or more trigger symbols 503*b* are rearranged (S38). In this process, whether or not three or more trigger symbols 503*b* are rearranged in the display blocks 28 is determined, without taking into consideration the paylines L. When it is determined in step S38 that three or more trigger symbols 503*b* are rearranged, the main CPU 41 sets the remaining bonus game count B to B=B+1 in the bonus game count recording region of the RAM 43 (S39).

When it is determined in step S38 that the number of trigger symbols 503*b* rearranged is less than three, or after the step S39, the main CPU 41 determines whether the remaining free game count T in the free game count recording region of the RAM 43 is 0 (S40). If the remaining free game count T is not 0, the main CPU 41 returns to step S34 and repeats the free game. If the remaining free game count T is 0, the main CPU 41 sets the remaining bonus game count B in the bonus game count recording region of the RAM 43 to B=B−1 (S41).

Then, the main CPU 41 determines whether the remaining bonus game count B in the bonus game count recording region of the RAM 43 is 0 (S42). If the remaining bonus game count B is 0, the main CPU 41 resets the counted number stored in the RAM 43 to the first predetermined number (i.e. 600), and turns off the insurance flag (S43). This routine is ended thereafter. That is, winning the bonus game will lead to automatic change to the non-insured mode.

On the other hand, when the remaining bonus game count B is not 0, the main CPU 41 sets the remaining free game count T in the free game count recording region of RAM 43 to 7, and returns to step S34 to repeat the process of the free game.

As described, when the remaining free game count T is 0, the remaining bonus game count B is decreased by 1, and the remaining free game count T is set to 7. In other words, the free game is repeated while the remaining free game count T is 1 or more, and the bonus game having a plurality of the free games is repeated while the remaining bonus game count B is 1 or more.

(Operation of Slot machine 10: Insurance Check Process)

Figure 19:
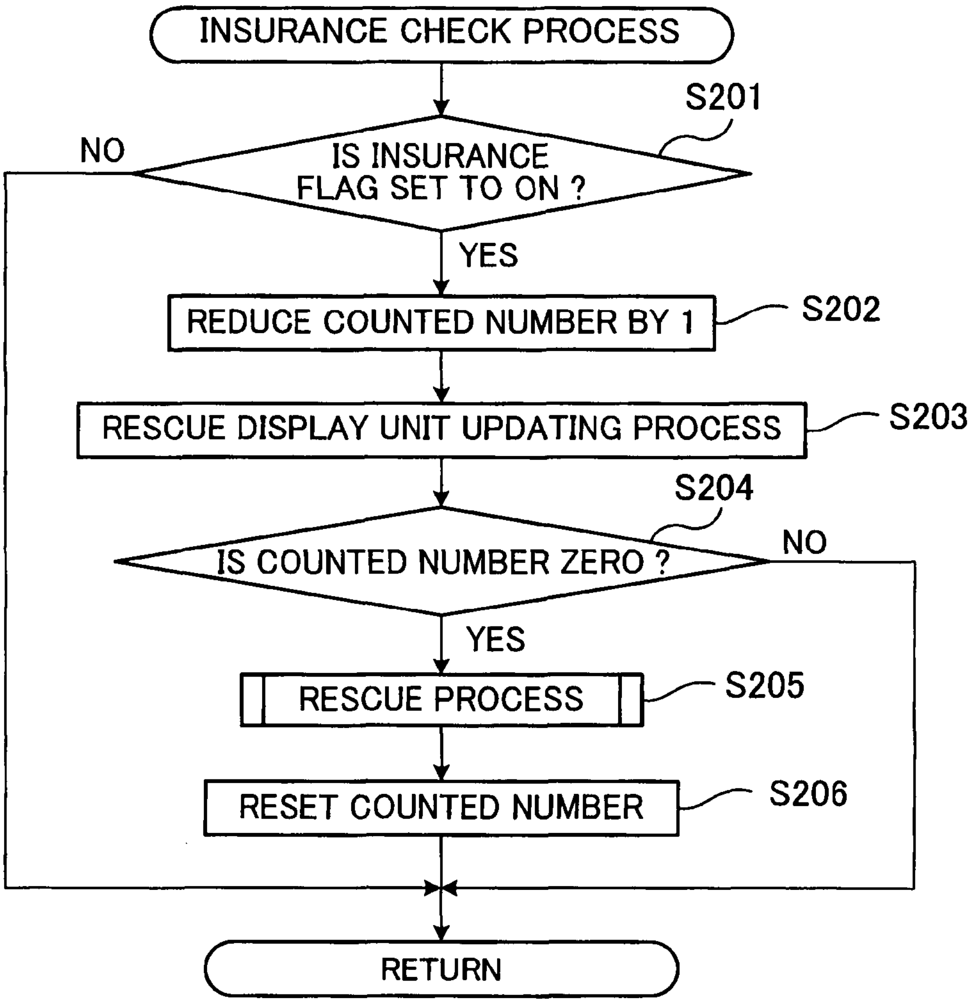
FIG. 19 is a flowchart of an insurance check process.

FIG. 19 shows a flowchart showing a sub routine of the insurance check process. This process is executed by the main CPU 41 running an insurance check program stored in the RAM 43. First, the main CPU 41 determines whether or not the insurance flag is “ON” (S201). This routine is ended, when the insurance flag is not “ON”, that is, when the insurance flag is “OFF” and the non-insured mode is active (S201: NO).

On the other hand, when the insurance flag is “ON”, that is, when the insured mode is active (S201: YES), the main CPU 41 reduces the counted number in the RAM 43 by 1 (S202). Then, there is performed a process for updating the display on the rescue display unit 417 in the symbol display device 16 (S203). The main CPU 41 then determines whether or not the counted number is 0 (S204). When the counted number is not “0” (S204: NO), this routine is ended.

On the other hand, when the counted number is “0” (S204: YES), a rescue process is executed (S205). This rescue process will be detailed later. Then, the counted number is reset (S206), and this routine is ended.

(Operation of Slot Machine 10: Rescue Process)

Figure 20:
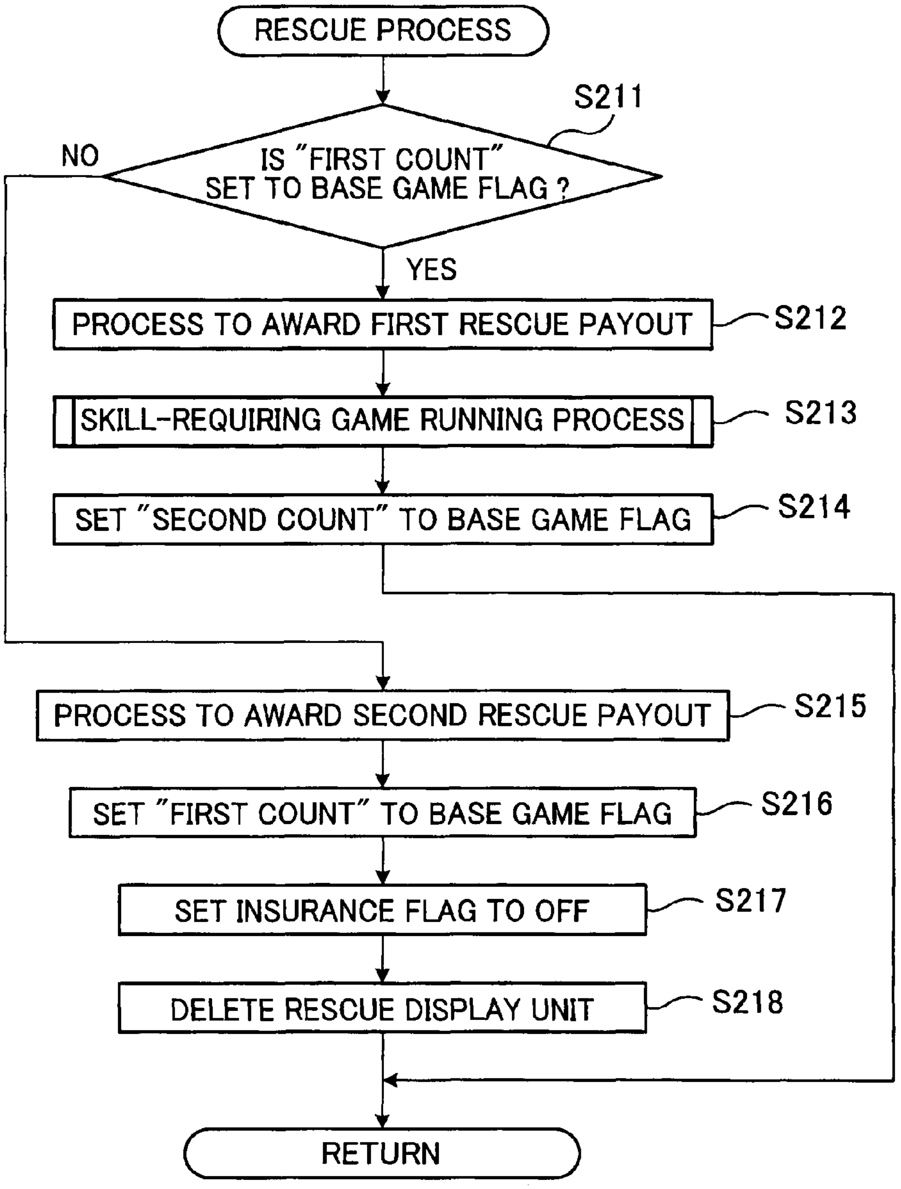
FIG. 20 is a flowchart of a rescue process.

FIG. 20 is a flowchart showing a sub routine of the rescue process. This process is executed by the main CPU 41 running the rescue payout program stored in the RAM 43.

First, the main CPU 41 determines whether or not the base game flag is the “first count” (S211). When the base game flag is the “first count” (S211: YES), the main CPU executes a first rescue payout award process (S212). Specifically, the main CPU 41 displays the rescue payout screen shown in FIG. 12, and performs a process of awarding a predetermined amount of payout (50 dollars in the present embodiment) as the first rescue payout. Then, the main CPU 41 performs the skill-requiring game running process (S213). The skill-requiring game running process is detailed later. The main CPU 41 then sets the “second count” to the base game flag (S214), and ends this routine.

On the other hand, when the base game flag is not the “first count” (S211: NO), that is, the base game flag is “second count”, there is executed a second rescue payout award process (S215). Specifically, the main CPU 41 displays the rescue payout screen shown in FIG. 12, and performs a process of awarding a predetermined amount of payout (20 dollars in the present embodiment) as the second rescue payout. The main CPU 41 then sets the “first count” to the base game flag (S214). After that, the main CPU 41 sets the insurance flag to “OFF” (S217), and deletes the rescue display unit 417 (S218). This routine is then ended.

(Operations of Slot Machine 10: Skill-Requiring Game Running Process)

Figure 21:
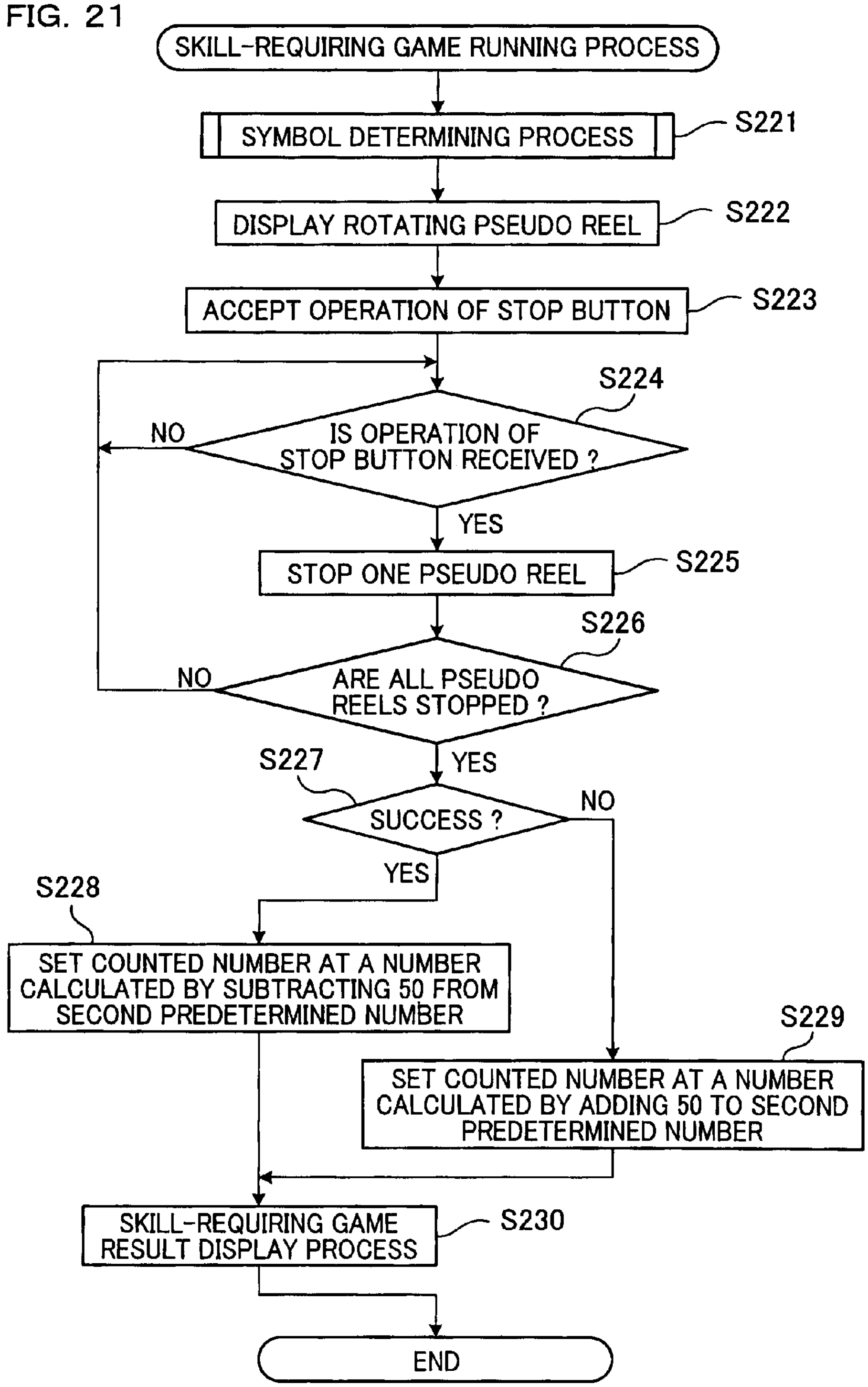
FIG. 21 is a flowchart illustrating a skill-requiring game running process.

FIG. 21 is a flowchart showing a sub routine of the skill-requiring game running process. This process is executed by the main CPU 41 running the skill-requiring game running program stored in the RAM 43.

First, the main CPU 41 executes the symbol determining process shown in FIG. 17 (S221). This way, the main CPU 41 determines the symbols 501 to be rearranged in the display blocks 28 of the symbol display device 16 as the result of the skill-requiring game. The main CPU 41 then displays the rotating pseudo reels 151 to 155 (S222). After a predetermined period elapse, the main CPU 41 starts accepting the operation of the stop button (S223). In other words, operation of the stop button 70 performed before the elapse of the predetermined period will not stop the rotation of the pseudo reels 151 to 155.

Next, the main CPU 41 determines whether or not an operation of the stop button is received (S224). Specifically, the main CPU 41 determines that an operation of the stop button is received by receiving a signal from the stop button switch 70S, after the predetermined period elapses from the start of rotation of the pseudo reels 151 to 155. Note that when the skill-requiring game is performed by the maximum bet button 27, the main CPU 41 determines whether the maximum bet button 27 is operated. When no operation of the stop button is received (S224: NO), the main CPU 41 repeats the process of step 224. This means that the main CPU 41 enters the standby mode until the stop button 70 is operated. When an operation of the stop button 70 is received (S224: YES), one of the pseudo reels 151 to 155 which is not yet stopped is stopped as shown in FIG. 14 (S225).

The main CPU 41 then determines whether all of the pseudo reels 151 to 155 are stopped (S226). If at least one of the pseudo reels is still rotating (S226: NO), the process returns to step S224 and wait for an operation of the stop button 70. When all the pseudo reels are stopped (S226: YES), the main CPU 41 determines whether the result of the skill-requiring game is a success (S227). Specifically, the main CPU 41 determines whether any of the winning combinations is achieved on any of the paylines L. That is, the result of the skill-requiring game is a success if any of the winning combinations is achieved, and is failed if no winning combination is achieved.

When the result of the skill-requiring game is a success (S227: YES), the main CPU 41 sets the counted number to the second predetermined number (default number: 200) minus 50 (S228). Further, when the result of the skill-requiring game is not a success (failure) (S227: NO), the main CPU 41 sets the counted number to the second predetermined number plus 50 (S229).

After step S228 or step S229, there is performed a skill-requiring game result display process which displays a skill-requiring game result display screen as shown in FIG. 15 (S230). The routine ends thereafter.

As described, the second predetermined number which indicates the number of games to be played until (shifting to the third state) the awarding of the second rescue payout is increased or decreased according to a result of the skill-requiring game run after the first rescue payout is awarded (after the second state). This provides a variation in the game so that the entertainment characteristic is enhanced and the player's motivation to continue the game is further increased as he/she expects awarding of the second rescue payout.

(Operation of Slot Machine 10: Insurance Mode Selection Process)

Figure 22:
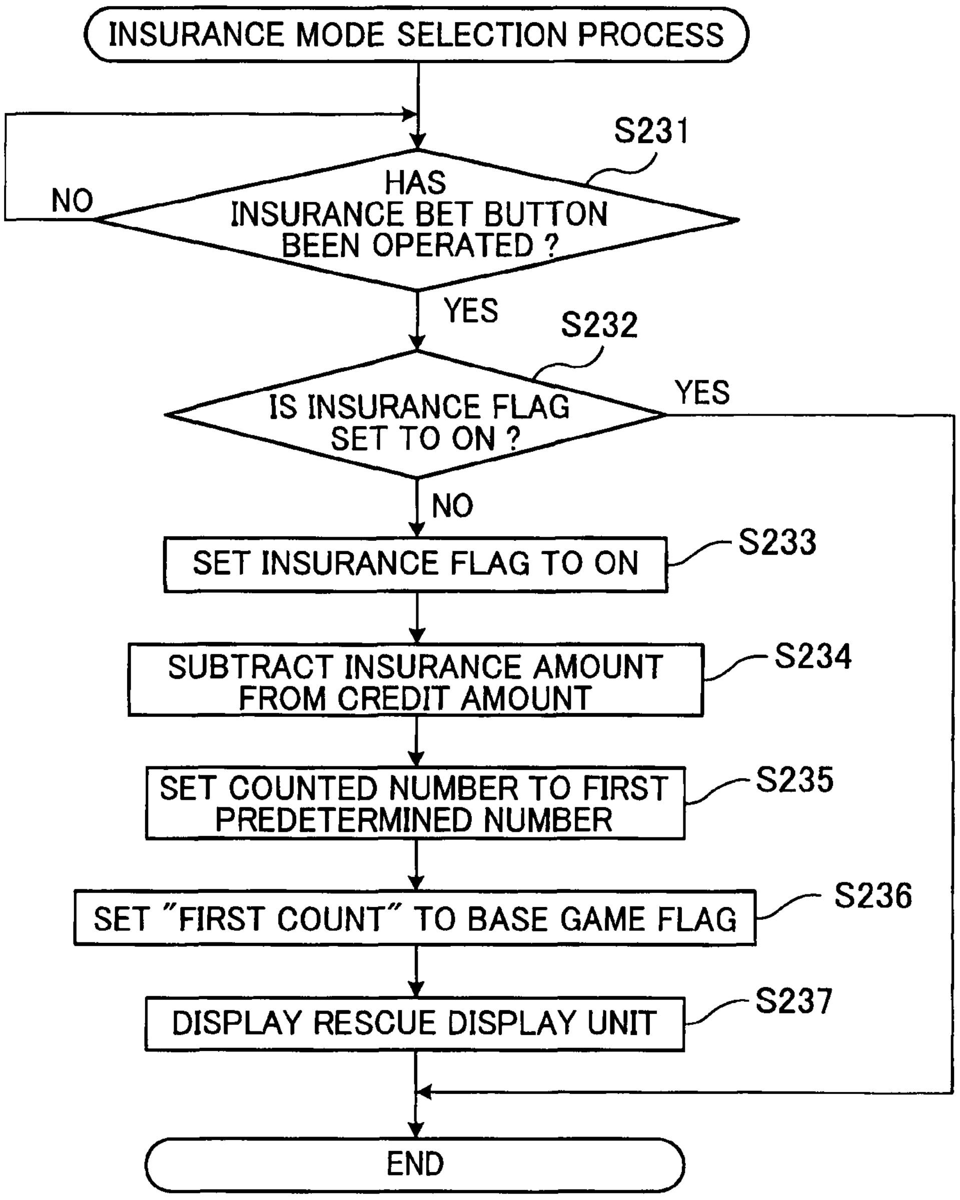
FIG. 22 is a flowchart illustrating an insurance mode selection process.

FIG. 22 shows a flowchart of a sub routine for selecting the insurance mode. This process is executed by the main CPU 41 running the insurance mode selection process program stored in the RAM 43.

First, the main CPU 41 determines whether or not the insurance bet button 90 is operated (S231). When the switching of the insured mode is done by the maximum bet button 27, the main CPU 41 determines whether or not the maximum bet button 27 is operated. Specifically, the main CPU 41 determines whether the insurance bet button 90 is operated by receiving a signal from the insurance bet switch 90S. If the insurance bet button 90 is not operated (S231: NO), the main CPU 41 repeats step 231. This means that the main CPU 41 enters the standby mode for waiting for an operation of the insurance bet button 90.

Next, when the insurance bet button 90 is operated (S231: NO), the main CPU 41 determines whether the insurance flag is "ON" (S232). If the insurance flag is "ON" (S232: YES), this routine is ended.

On the other hand, if the insurance flag is not "ON" (S232: NO), the main CPU 41 sets "ON" to the insurance flag (S233). Then the main CPU 41 reduces the insurance fee from the credit amount stored in the RAM 43 (S234). When the credit amount is less than the insurance fee stored in the RAM 43, the player is reported that the credit amount falls short, through the symbol display device 16. Then, the insurance flag is set to "OFF" and the routine ends thereafter. This is however not illustrated. Note that the structure may be adapted so that, when the credit amount stored in the RAM 43 is less than the insurance fee, the subsequent process are executed if the player entered additional credit.

After the step S234, the main CPU 41 sets the first predetermined number (600 in the present embodiment) to the counted number of the RAM 43 (S235). Then, the main CPU 41 sets the "first count" to the base game flag of the RAM 43 (S236). After that, the main CPU 41 displays the rescue display unit 417 on the symbol display device 16 in the base game (S237), and ends this routine thereafter.

As described, in the base game after the skill-requiring game, the number of games until awarding of the second rescue payout is notified through the symbol display device 16 displaying the rescue display unit 417. This allows the player to recognize the second predetermined number which is the result of the skill-requiring game, thereby motivating the player to continue to play the game.

Further, the process to count the number of base games is carried out only when the insured mode has been set by the insurance bet button 90 which can switch between the insured mode and the non-insured mode. That is, the chances of receiving the first rescue payout and the second rescue payout are given only in the insured mode. This allows the player to play the game with a desired mode, thereby further enhancing the entertainment characteristic.

In the present embodiment, the insurance fee is requested to activate the insured mode. Therefore, the player is able to select the insured mode by paying the insurance fee, in which mode shifting to more advantageous state occurs based on the number of games having been played, or select the non-insured mode by not paying the insurance fee, in which mode shifting to more advantageous state does not occur.

(Second Embodiment)

The following will describe a slot machine 10 (gaming machine 300) of the present embodiment with reference to FIG. 23 to FIG. 26. The present embodiment is different from the first embodiment in that, in the present embodiment, the condition in which the second rescue payout is awarded as the third state is satisfied when, in a base game in the insured mode after reset, no bonus game has been run and a second predetermined number (850 or 750 in the present embodiment) of unit games have been run, the second predetermined number being determined in a skill-requiring game. In this embodiment, the same components and processes as in the first embodiment may be denoted by the same reference numerals, respectively, and the description thereof may be omitted.

(Electric Structure of Slot Machine 10)

In the present embodiment, a RAM 43 is provided with a counted number recording region in the same manner as the first embodiment. In the first embodiment, the counted number recording region stores a default number of counting (first predetermined number or an increased/decreased second predetermined number), and the counted number is reduced by 1 each time a base game is run. On the other hand, in the present embodiment, the default number of the counted number is "0" and the counted number is incremented by 1 each time a base game is run. Therefore, to reset the counted number in the present embodiment is to set the counted number to "0".

In the present embodiment, the RAM 43 is provided with a first predetermined number recording region storing a first predetermined number and a second predetermined number recording region storing a second predetermined number. The first predetermined number recording region stores a predetermined number (600 in the present embodiment). The second predetermined number recording region stores a number calculated by increasing or decreasing a default second predetermined number (850 or 750 in the present embodiment).

(Display State)

The following describes an exemplary display status of the symbol display device 16 in the operation of the slot machine 10.

(Base Game Screen: During Game)

Figure 23:
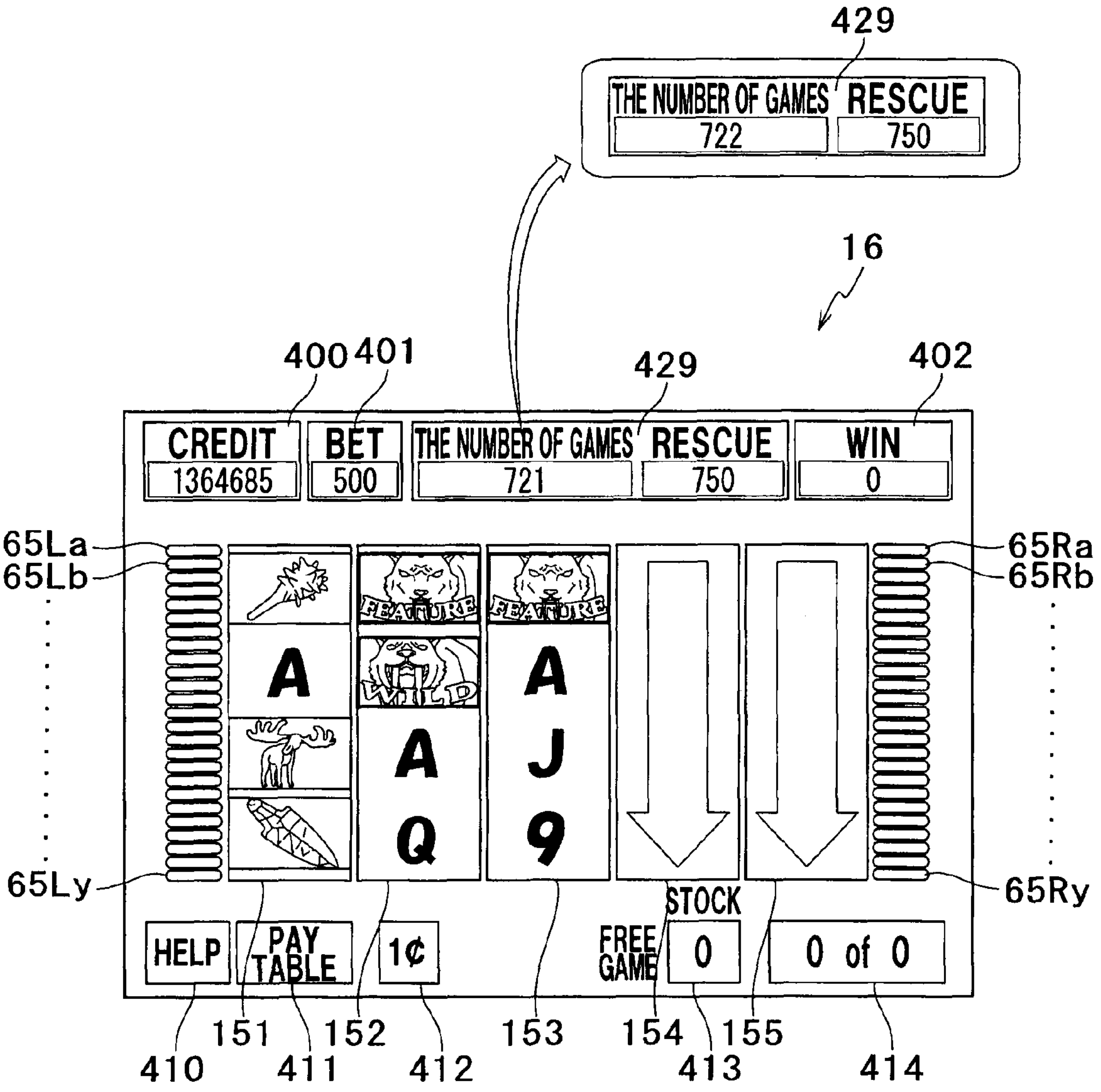
FIG. 23 is an explanatory diagram illustrating a display status of the symbol display device.

FIG. 23 illustrates an exemplary base game screen which is a screen displayed on the symbol display device 16, during the base game.

More specifically, this screen is different from the base game screen described in the first embodiment with reference to FIG. 9 in that, in place of the rescue display unit 417 indicating the number of unit games until a rescue payout indicated by a counted number stored in the RAM 43, a rescue display unit 429 having an area displaying the current number of games and an area displaying the number of games from reset of the counter to a rescue payout is displayed.

The area of the rescue display unit 429 which area displays the number of games required to obtain a rescue payout displays the number of games from reset of the counting to the next rescue payout. In other words, the first predetermined number is displayed when the number of games has not reached the first predetermined number, whereas the second predetermined number determined in a skill-requiring game is displayed when the number of games has reached the first predetermined number.

For example, FIG. 23 shows that, when the rescue display unit 429 shows that the current number of games is "721" and the number of games required to obtain a rescue payout is "750", the number of games shown by the rescue display unit 429 becomes "722" when one more unit game is run, as shown in the upper right part of FIG. 23.

As such, since information based on the number of games until the shifting to a rescue payout in a base game is displayed (notified), the player can easily recognize that a rescue payout is awarded when the current number of games on the rescue display unit 429 reaches the number of games required to obtain a rescue payout displayed on the rescue display unit 429. The display state is not limited to this arrangement, and hence the rescue display unit 417 described in the first embodiment may be displayed.

(Operation of Slot Machine 10)

The following will describe the operation of the slot machine 10 of the present embodiment. It is noted that the reset of the counted number in the present embodiment is to set "0" in the counted number recording region of the RAM 43.

(Operation of Slot Machine 10: Insurance Check Process)

Figure 24:
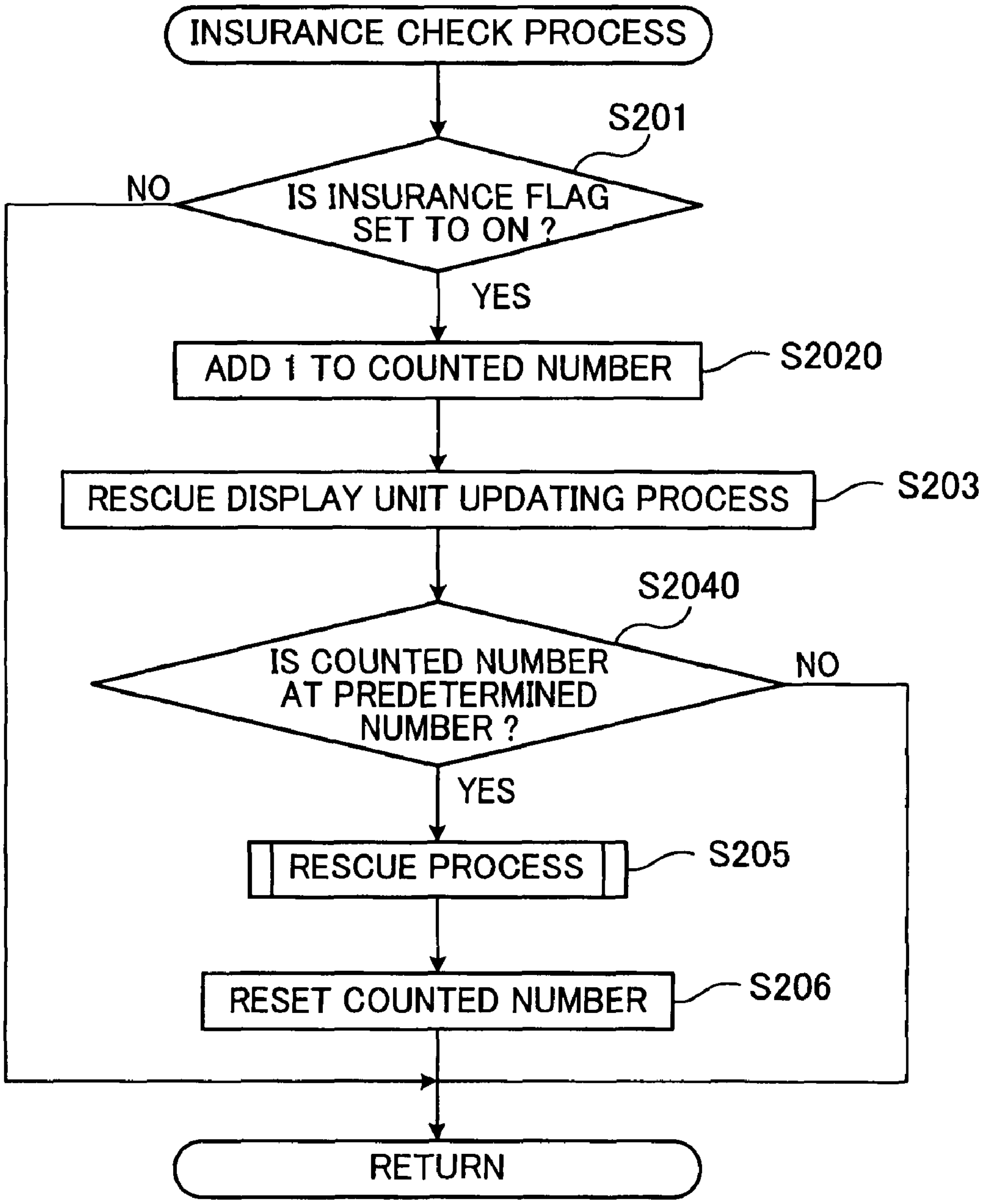
FIG. 24 is a flowchart of an insurance check process.

In the present embodiment, an insurance check process shown in FIG. 24 is carried out in place of the insurance check process described in the first embodiment with reference to FIG. 19.

FIG. 24 is a flowchart showing a sub routine of the insurance check process. This process is executed by the main CPU 41 running the insurance check program stored in the RAM 43. The insurance check process of the present embodiment is different from the insurance check process of the first embodiment in that the step S2020 is carried out in place of the step S202 and that the step S2040 is carried out in place of the step S204.

More specifically, when in the step S201 the insurance flag is set to "ON", i.e., when the insured mode has been set (S201: YES), the main CPU 41 adds 1 to the counted number in the RAM 43 (S2020). Thereafter, the step S203 is carried out.

After the step S203 is carried out, the main CPU 41 determines whether the counted number is equal to a predetermined number (S2040). More specifically, when the base game flag is set to the first count, whether the counted number is equal to the first predetermined number is determined. When the base game flag is set to the second count, whether the counted number is equal to the second predetermined number is determined. When the counted number is equal to the predetermined number (S2040: YES), the step S205 is carried out. When the counted number is not equal to the predetermined number (S2040: NO), the routine is finished.

(Operations of Slot Machine 10: Skill-Requiring Game Running Process)

The following will describe the operation of the slot machine 10 of the present embodiment. In the present embodiment, a skill-requiring game running process shown in FIG. 25 is run in place of the skill-requiring game running process described in the first embodiment with reference to FIG. 21.

Figure 25:
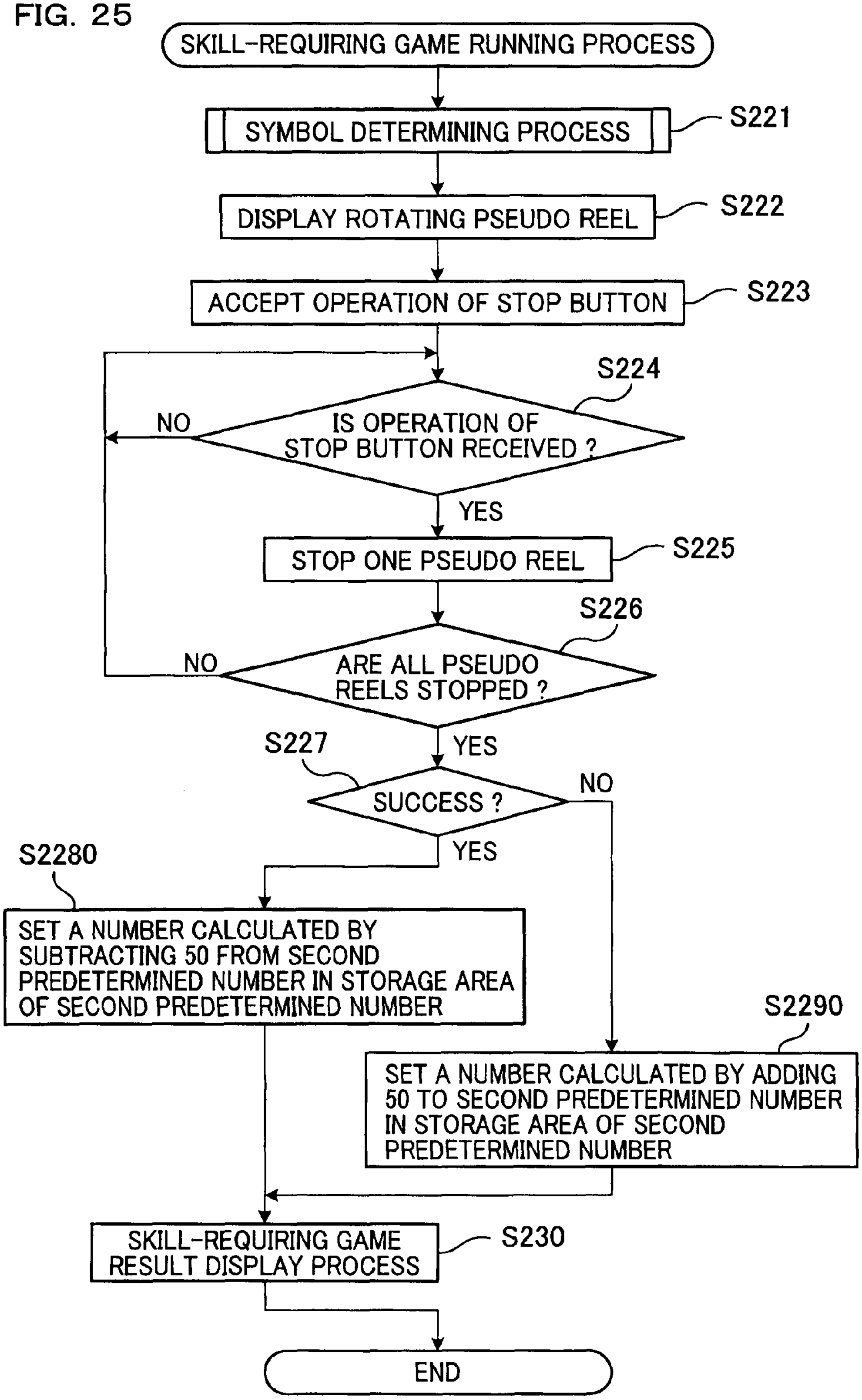
FIG. 25 is a flowchart illustrating a skill-requiring game running process.

FIG. 25 is a flowchart showing a sub routine of the skill-requiring game running process. This process is executed by the main CPU 41 running a skill-requiring game running program stored in the RAM 43. The skill-requiring game running process of the present embodiment is different from the skill-requiring game running process of the first embodiment in that the step S2280 is carried out in place of the step S228 and the step S2290 is carried out in place of the step S229.

More specifically, if it is determined in the step S227 that a result of a skill-requiring game is a success (S227: YES), the main CPU 41 set a number calculated by subtracting 50 from the second predetermined number (whose default number is 800) to the second predetermined number recording region of the RAM 43 (S2280). On the other hand, if the result of the skill-requiring game is not a success (i.e. is a failure) (S227: NO), the main CPU 41 set a number calculated by adding 50 to the second predetermined number to the second predetermined number recording region of the RAM 43 (S2290). After the step S2280 or the step S2290, the routine is finished.

As such, the present embodiment is different from the first embodiment in that, the counted number is not reset even if a skill-requiring game is run after a first rescue payout is awarded, and the counting of the number of base games, which starts after the counted number is reset, is continued.

(Operation of Slot machine 10: Insurance Mode Selection Process)

The following will describe the operation of the slot machine 10 of the present embodiment. In the present embodiment, an insurance mode selection process shown in FIG. 25 is carried out in place of the insurance mode selection process described in the first embodiment with reference to FIG. 21.

Figure 26:
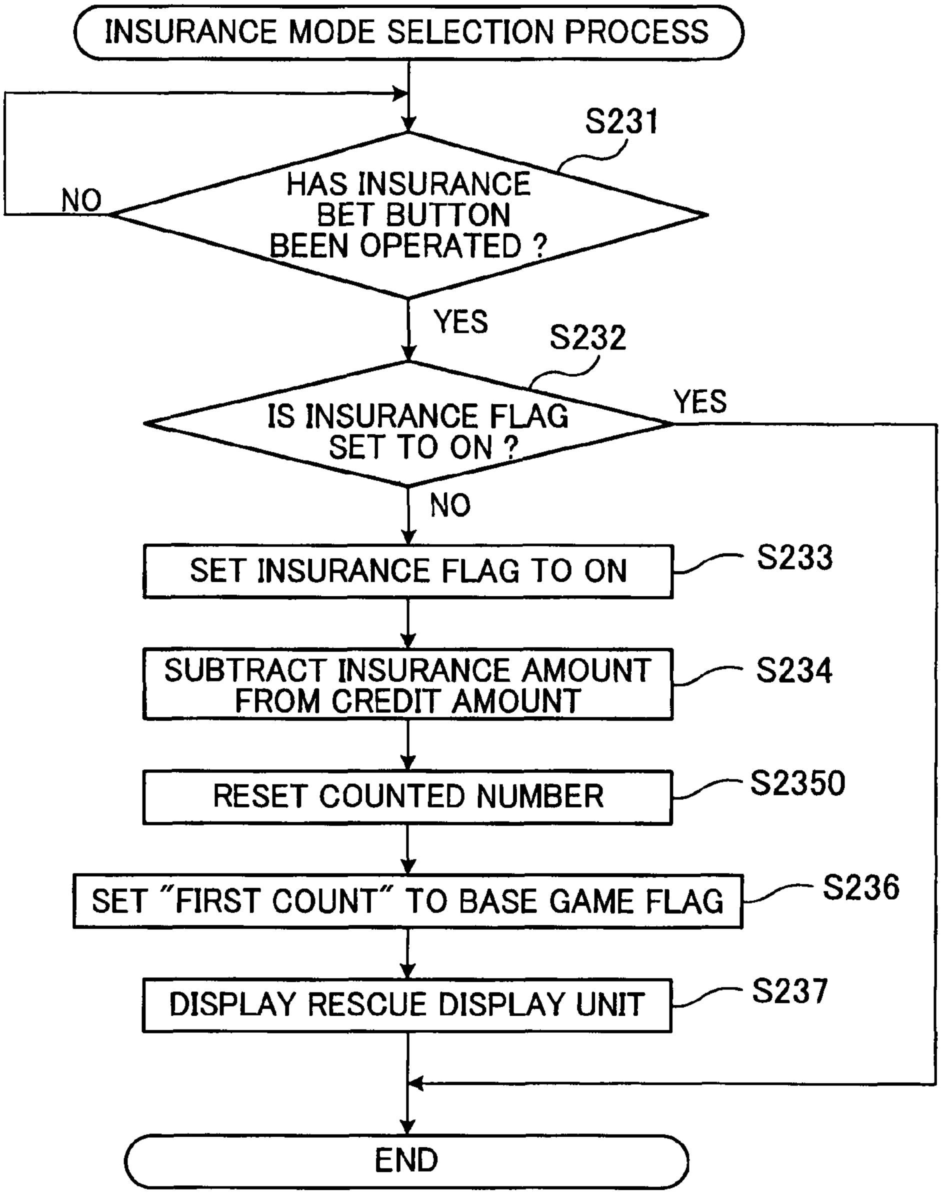
FIG. 26 is a flowchart illustrating an insurance mode selection process.

FIG. 26 is a flowchart showing a sub routine of the insurance mode selection process. This process is executed by the main CPU 41 running a skill-requiring game running program stored in the RAM 43. The insurance mode selection process of the present embodiment is different from the insurance mode selection process of the first embodiment in that, in the present embodiment, the step S2350 is carried out in place of the step S235. Note that, in the process of displaying the rescue display unit in the step S237, the main CPU 41 causes the symbol display device 16 to display the rescue display unit 429.

More specifically, after the step S234, the main CPU 41 resets the counted number (S2350). More specifically, a value indicating "0" is stored in the counted number recording region of the RAM 43. Then the step S236 is carried out.

The present embodiment deal with a case where the number of paylines L is 25; however, the number of paylines is not limited. For example, the number of paylines may be 30.

The present embodiment deal with a case where a winning of bonus is achieved when three or more trigger symbols are rearranged. However, the winning of bonus is not limited to this. For example, winning of bonus may be achieved when a predetermined time has elapsed since the last bonus game has ended.

Further, in the present embodiment, the bonus game (free game) is a game in which displaying of symbols on display blocks 28 are varied and stopped, and then a payout amount is determined according to the symbols having stopped or a combination of the stopped symbols (i.e. a game normally run in a slot machine). However, the bonus game of the present invention is not limited to this, and may be different from a game run in a slot machine. Examples of the free game include: a card game such as poker, a shooting game, a fighting game, or the like. The free game may be a game that awards a game medium or a game awarding no game medium. The free game in the present invention may be suitably designed, and is not particularly limited, as long as the free game requires no bet of a game medium.

In the present embodiment, the base game is a so-called slot game. The present invention, however, is not limited to this. Other examples of the base game include blackjack, roulette, and various types of book games. Also, the base game may be a mixture of plural types of games.

In the present embodiment, the skill-requiring game is arranged so that plural symbols are stopped when the stop button 70 is pressed, and a result of the skill-requiring game which is determined in advance at the start of the skill-requiring game is output. The present invention, however, is not limited to this arrangement. For example, a result of the skill-requiring game may be determined by a timing of the pressing of the stop button 70.

In the present embodiment, whether a result of the skill-requiring game is a success or a failure is determined according to whether any winning combination is formed on any payline L in the skill-requiring game. The present invention, however, is not limited to this arrangement. For example, a result may be determined according to whether a predetermined winning combination is formed.

In the present embodiment, a success in the skill-requiring game is achieved and a predetermined value (50) is subtracted from the second predetermined number (200), when any winning combination is formed on any payline L in the skill-requiring game. The present invention, however, is not limited to this arrangement. For example, a number which is subtracted from the second predetermined number may be increased or decreased according to the formed winning combination.

For example, a number which is subtracted from the second predetermined number may be increased or decreased according to the number of symbols forming a winning combination. More specifically, for example, when the skill-requiring game results in a success and three symbols of the same type are rearranged on any payline, the second predetermined number is reduced by 50. When four symbols of the same are rearranged on any payline, the second predetermined number is reduced by 70. When five symbols of the same type are rearranged on any payline, the second predetermined number is reduced by 100.

Alternatively, for example, a number subtracted from the second predetermined number may be increased or decreased in accordance with the type of symbols forming a winning combination. More specifically, for example, when the skill-requiring game results in a success and a winning combination of “A” is formed on a payline, the second predetermined number is reduced by 50. When a winning combination of “K” is formed on a payline, the second predetermined number is reduced by 70. When a winning combination of “Q” is formed on a payline, the second predetermined number is reduced by 100.

The present embodiment defines that “shift to the second state and the third state which are more advantageous for the player than the base game” indicates “awarding payouts (the first rescue payout and the second rescue payout)”. The present invention, however, is not limited to this arrangement. The “first state”, the “second state”, and the “third state” may be any types of states as long as they are “more advantageous for the player than the base game”. For example, the shifting to the second state and/or the shifting to the third state may be running of a bonus game (feature game) including a free game as in the present embodiment or may be both of awarding of a payout and running of a bonus game.

Figure 27:
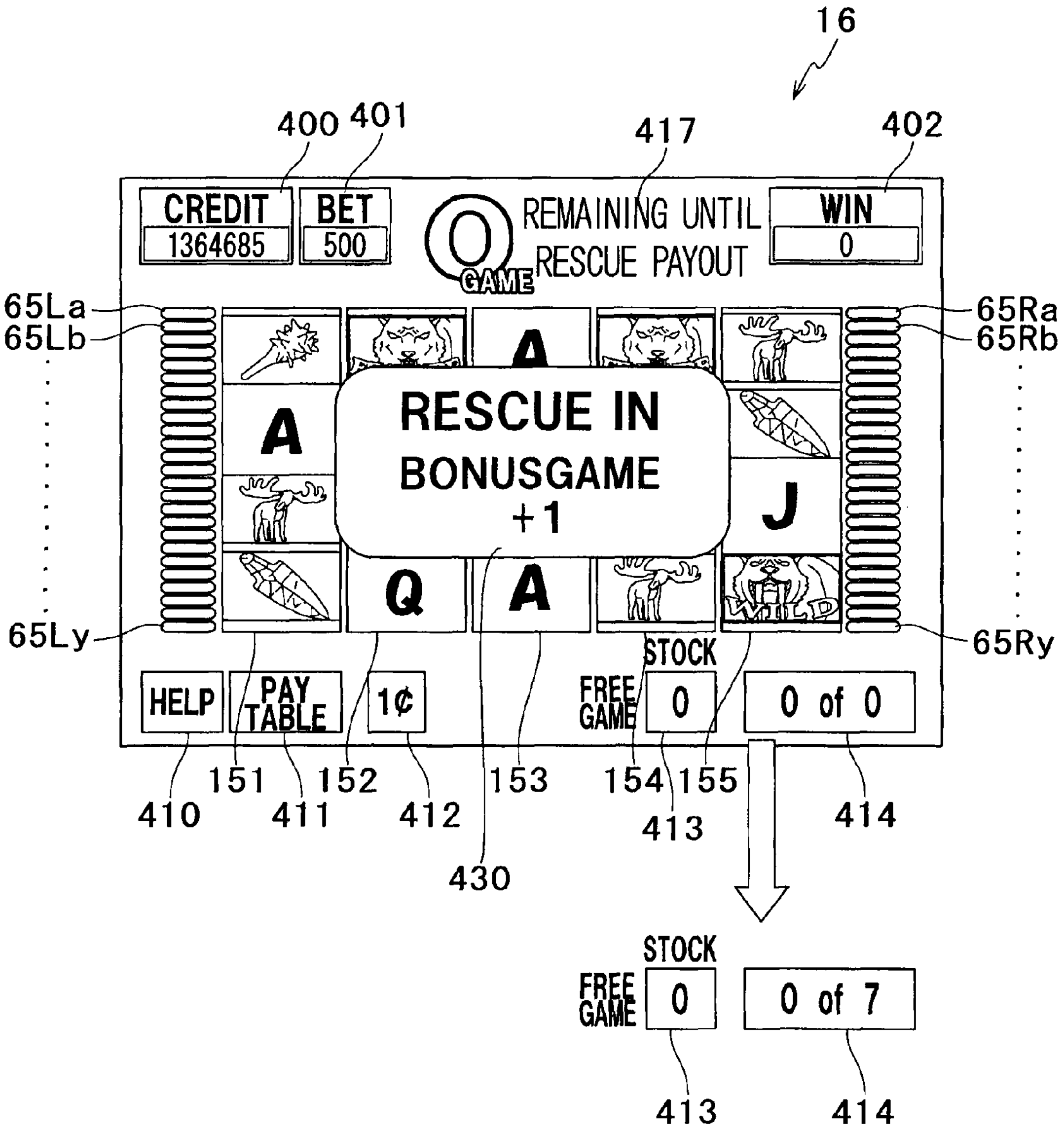
FIG. 27 is an explanatory diagram illustrating a variation of a display status of the symbol display device.

As an example of the arrangement above, a modification in which “shifting to the second state” is “running of a bonus game” will be described with reference to FIG. 27 and FIG. 28. In this embodiment, the same components and processes as in the first embodiment may be denoted by the same reference numerals, respectively, and the description thereof may be omitted.

(Display state)(Rescue-In Screen)

This is a display screen at the start of the shifting to the second state when “shifting to the second state” is “running of a bonus game”. When the first predetermined number is counted in a base game, displayed is not a rescue payout screen shown in FIG. 12 but a rescue-in screen shown in FIG. 27. On the rescue-in screen, a rescue-in report screen 430 pops up for a predetermined period of time. On the rescue-in report screen 430 are displayed text information “RESCUE IN” to notify the start of the rescue process and text information “BONUS GAME+1” indicating the number of bonus games awarded in the rescue process. The bonus game can be run once. In other words, seven free games become runnable, and the display by the free game count display unit 414 is updated.

In case where “shifting to the third state” is “running of a bonus game”, a rescue-in screen may be displayed also when, for example, the first predetermined number is counted. When “shifting to the second state” and “shifting to the third state” are “awarding of payout” and running of a bonus game”, respectively, a rescue payout notifying screen 425 and a rescue-in report screen 430 may be displayed on the symbol display device 16 after the end of the base game.

(Operation of Slot Machine 10: Rescue Process)

The following will describe the operation of the slot machine 10 when “shifting to the second state” is “running of a bonus game”. In this modification, a rescue process shown in FIG. 28 is carried out in place of the rescue process shown in FIG. 20.

Figure 28:
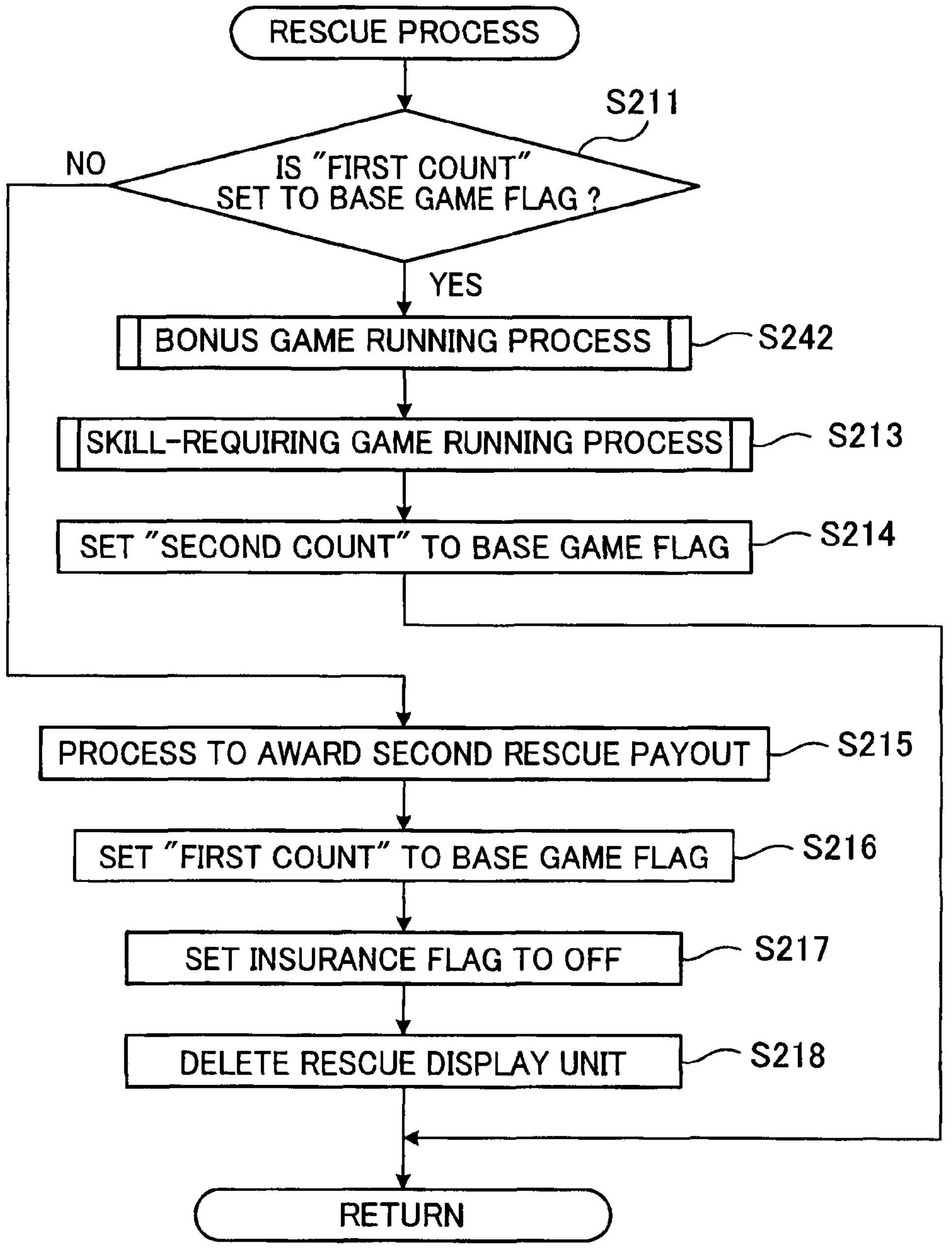
FIG. 28 is a flowchart of a rescue process of the variation.

FIG. 28 is a flowchart showing a sub routine of the rescue process. This process is executed by the main CPU 41 running a rescue program stored in the RAM 43.

The rescue process of the modification is different from the first embodiment in that, in the modification a bonus game is run when the counting of the first count is finished. More specifically, as shown in FIG. 28, the rescue process of the modification is different from the first embodiment in that, in the modification, a bonus game running process is carried out (S242) in place of the step S212 of the rescue process shown in FIG. 20. The bonus game which is run in the step S242 is shown in FIG. 18.

When “shifting to the third state” is “running of a bonus game”, for example a bonus game running process may be run in place of the step S215 of the rescue process shown in FIG. 20. When “shifting to the second state” and “shifting to the third state” are “awarding of payout” and “running of a bonus game”, respectively, a bonus game running process may be carried out after the step S212 and the step S215 of FIG. 20, for example.

The above embodiment thus described solely serves as a specific example of the present invention, and the present invention is not limited to such an example. Specific structures of various means and the like may be suitably designed or modified. Further, the effects of the present invention described in the above embodiment are not more than examples of most preferable effects achievable by the present invention. The effects of the present invention are not limited to those described in the embodiments described above.

Further, the detailed description above is mainly focused on characteristics of the present invention to fore the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process performed in or by respective step S yielding one result or blocks with a predetermined processing function described in the present specification shall be understood as a process with no self-contradiction. Further, the electrical or magnetic signal is transmitted/received and written in the respective step S or blocks. It should be noted that such a signal is expressed in the form of bit, value, symbol, text, terms, number, or the like solely for the sake of convenience. Although the present specification occasionally personifies the processes carried out in the step S or blocks, these processes are essentially executed by various devices. Further, the other structures necessary for the step S or blocks are obvious from the above descriptions.

The present invention can be used in gaming machines in general.

What is claimed is:

1. A gaming machine, comprising:

a first input device which is able to receive an operation from outside; and a controller programmed to execute:

(a1) a process to run a base game which is started based on betting and awards a base payout according to a result;

(a2) a process to count the number of base games having been run;

(a3) a process to shift to a first state which is more advantageous for a player than the base game, if the result of the base game satisfies a predetermined condition;

(a4) a process to reset counting of the number of base games if shifting to the first state has been done;

(a5) a process to shift to a second state which is more advantageous for the player than the base game, if the number of counted base games becomes equal to a first predetermined number;

(a6) a process to run, after the second state, a skill-requiring game which outputs a result in accordance with an operation input to the first input device;

(a7) a process to increase or decrease a second predetermined number based on a result of the skill-requiring game;

(a8) a process to run the base game after the skill-requiring game; and (a9) a process to shift to a third state which is more advantageous for the player than the base game, when the number of base games run after the skill-requiring game becomes equal to the second predetermined number of base games after increase or decrease, wherein the number of base games counted before shift to one of the second state and third state is not shown to a game player.

2. The gaming machine according to claim 1, further comprising:

a second input device which is able to switch between an insured mode and a non-insured mode, wherein, the controller is programmed to execute the process (a2) only when the insured mode has been set by the second input device.

3. The gaming machine according to claim 2, wherein, the first input device functions as a maximum bet device which carries out the betting with a maximum bet value in response to an input from the outside, and the maximum bet device also functions as a second input device.

4. The gaming machine according to claim 1, further comprising:

a second input device which is able to switch between an insured mode and a non-insured mode, wherein, the controller is programmed to execute the process (a2) only when the insured mode has been set by the second input device.

5. A gaming method of a gaming machine, comprising the step S of:

running a base game which is started based on betting and awards a base payout according to a result;

counting the number of base games having been run;

shifting to a first state which is more advantageous for a player than the base game, if the result of the base game satisfies a predetermined condition;

resetting counting of the number of base games if shifting to the first state has been done;

shifting to a second state which is more advantageous for the player than the base game, if the number of counted base games becomes equal to a first predetermined number;

running, after the second state, a skill-requiring game which outputs a result in accordance with an operation input to a first input device which is able to receive an operation from outside;

increasing or decreasing a second predetermined number based on a result of the skill-requiring game;

running the base game after the skill-requiring game; and shifting to a third state which is more advantageous for the player than the base game, when the number of base games run after the skill-requiring game becomes equal to the second predetermined number of base games after increase or decrease, wherein the number of base games counted before shift to one of the second state and third state is not shown to a game player.

6. A gaming machine, comprising:

a first input device which is able to receive an operation from outside; and a controller programmed to execute:

(a1) a process to run a base game which is started based on betting and awards a base payout according to a result;

(a2) a process to count the number of base games having been run;

(a3) a process to shift to a first state which is more advantageous for a player than the base game, if the result of the base game satisfies a predetermined condition;

(a4) a process to reset counting of the number of base games if shifting to the first state has been done;

(a5) a process to shift to a second state which is more advantageous for the player than the base game, if the number of counted base games becomes equal to a first predetermined number;

(a6) a process to run, after the second state, a skill-requiring game which outputs a result in accordance with an operation input to the first input device;

(a7) a process to increase or decrease a second predetermined number based on a result of the skill-requiring game;

(a8) a process to run the base game after the skill-requiring game; and (a9) a process to shift to a third state which is more advantageous for the player than the base game, when the number of base games becomes equal to the second predetermined number of base games, wherein the number of base games counted before shift to one of the second state and third state is not shown to a game player.

7. The gaming machine according to claim 6, further comprising:

a second input device which is able to switch between an insured mode and a non-insured mode, wherein, the controller is programmed to execute the process (a2) only when the insured mode has been set by the second input device.

8. The gaming machine according to claim 6, further comprising:

a second input device which is able to switch between an insured mode and a non-insured mode, wherein, the controller is programmed to execute the process (a2) only when the insured mode has been set by the second input device.

9. A gaming method of a gaming machine, comprising the step S of:

running a base game which is started based on betting and awards a base payout according to a result;

counting the number of base games having been run;

shifting to a first state which is more advantageous for a player than the base game, if the result of the base game satisfies a predetermined condition;

resetting counting of the number of base games if shifting to the first state has been done;

shifting to a second state which is more advantageous for the player than the base game, if the number of counted base games becomes equal to a first predetermined number;

running, after the second state, a skill-requiring game which outputs a result in accordance with an operation input to a first input device which is able to receive an operation from outside;

increasing or decreasing a second predetermined number based on a result of the skill-requiring game;

running the base game after the skill-requiring game; and shifting to a third state which is more advantageous for the player than the base game, when the number of base games becomes equal to the second predetermined number of base games, wherein the number of base games counted before shift to one of the second state and third state is not shown to a game player.

* * * * *